(12) United States Patent
Hattori

(10) Patent No.: US 8,300,272 B2
(45) Date of Patent: Oct. 30, 2012

(54) IMAGE GENERATING DEVICE, IMAGE GENERATING METHOD AND PRINTING DEVICE

(75) Inventor: Hiroshi Hattori, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 654 days.

(21) Appl. No.: 12/412,268

(22) Filed: Mar. 26, 2009

(65) Prior Publication Data

US 2009/0244629 A1    Oct. 1, 2009

(30) Foreign Application Priority Data

Mar. 31, 2008 (JP) ................. 2008-093263

(51) Int. Cl.
*H04N 1/40* (2006.01)
(52) U.S. Cl. ..................... 358/3.01; 345/419
(58) Field of Classification Search ............ None
See application file for complete search history.

(56) References Cited

U.S. PATENT DOCUMENTS

| | | | |
|---|---|---|---|
| 6,011,556 A | 1/2000 | Narita et al. | |
| 6,201,550 B1 | 3/2001 | Sakamoto | |
| 6,903,828 B1* | 6/2005 | Kawano et al. ............ | 358/1.11 |
| 2006/0244748 A1* | 11/2006 | Long et al. .................. | 345/422 |
| 2007/0273686 A1* | 11/2007 | Watanabe et al. ............ | 345/419 |

FOREIGN PATENT DOCUMENTS

| | | |
|---|---|---|
| JP | H04-023084 A | 1/1992 |
| JP | H04-115378 A | 4/1992 |
| JP | H04-302068 A | 10/1992 |
| JP | H05-006439 A | 1/1993 |
| JP | H09-307740 A | 11/1997 |
| JP | H11-31231 A | 2/1999 |
| JP | 2000-138816 A | 5/2000 |
| JP | 2004-154449 A | 6/2004 |
| JP | 2006-065817 A | 3/2006 |

OTHER PUBLICATIONS

Japan Patent Office; Notification of Reasons of Rejection in Japanese Patent Application No. 2008-093263 (counterpart to the above-captioned patent application) mailed Apr. 20, 2010.

European Patent Office; European Search Report in European Patent Application No. 09250934.8 (counterpart to the above-captioned US Patent Application) mailed on Jul. 30, 2010.

(Continued)

*Primary Examiner* — Twyler Haskins
*Assistant Examiner* — Helen Q Zong
(74) *Attorney, Agent, or Firm* — Baker Botts L.L.P.

(57) ABSTRACT

An image generating device, for generating an image including a gradation (in which a color value specifying color changes from the center of the gradation through annular areas) according to an image drawing instruction, comprises an extraction unit that extracts gradation pattern parameters specifying a gradation pattern of the gradation from the image drawing instruction, an area determination unit that determines the annular areas, each having a prescribed width, to be drawn in one color with a uniform color value, based on the gradation pattern parameters extracted by the extraction unit, and a drawing unit that draws the annular areas such that each annular area is drawn in one color and the colors in annular areas are different from each other.

9 Claims, 10 Drawing Sheets

OTHER PUBLICATIONS

Jean-Jacques Bourdin, A Simple Problem of Constant—A Simple Constant Problem, Artificial Intelligence Laboratory, University Paris 8, 2 rue de la Liberte. 93526 Saint-Denis cedex.

J.J. Bourdin and J.P. Braquelaire, Incremental Generation of Shading Supports, Laboratoire Bordelais de Rechereche en Informatique—Unite de Recherche.

The State Intellectual Property Office of the People's Republic of China, Notification of First Office Action for Chinese Patent Application No. 200910133030.9 (counterpart to above-captioned patent application), issued May 25, 2011.

* cited by examiner

```
<RadialGradientBrush
        MappingMode="Absolute"
31───    Center="150, 150"
32───    GradientOrigin="200, 170"
33───    RadiusX="140"
34───    RadiusY="100">
        <RadialGradientBrush.GradientStops>
35 {        <GradientStop Color="#FFFF00" Offset="0" />    ───35a
            <GradientStop Color="#0000FF" Offset="1" />    ───35b
        </RadialGradientBrush.GradientStops>
</RadialGradientBrush>
```

Center="Cx, Cy"              : CENTER COORDINATES OF ELLIPTICAL SHAPE(Cx, Cy)
GradientOrigin="Gx, Gy"      : CENTER COORDINATES OF GRADATION(Gx, Gy)
RadiusX="Rx"                 : X-RADIUS(RADIUS IN X-AXIS DIRECTION)Rx
RadiusY="Ry"                 : Y-RADIUS(RADIUS IN Y-AXIS DIRECTION)Ry
GradientStop Color="#RsGsBs" Offset="0"
                             : COLOR VALUES AT CENTER OF GRADATION Rs, Gs, Bs
GradientStop Color="#ReGeBe" Offset="1"
                             : COLOR VALUES AT PERIPHERY OF ELLIPSE Re, Ge, Be

FIG.2A

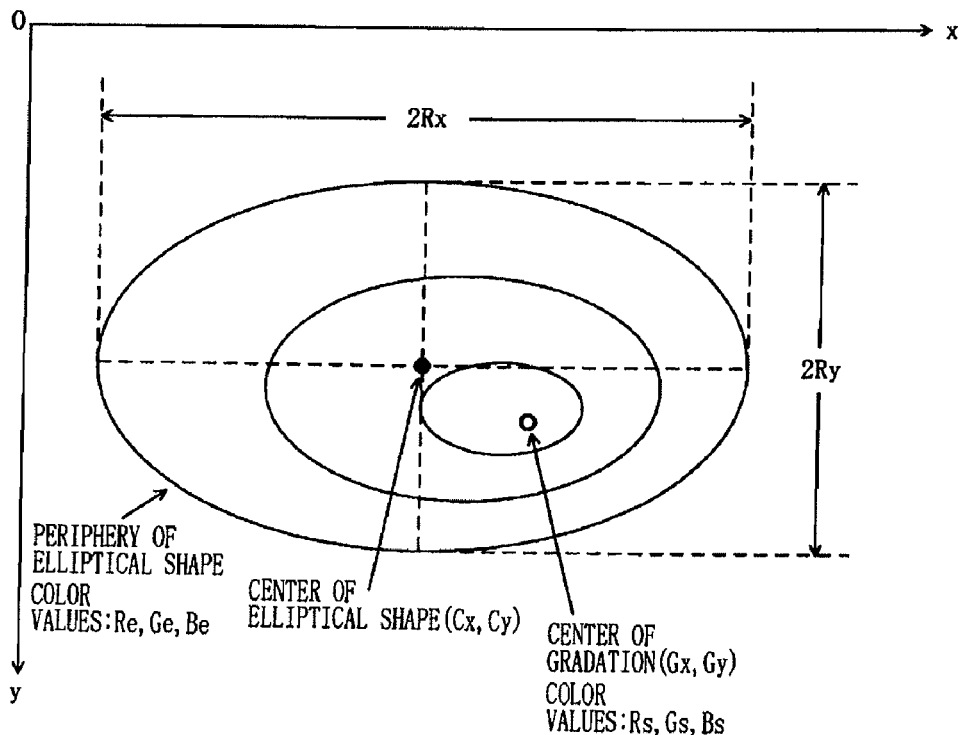

FIG.2B

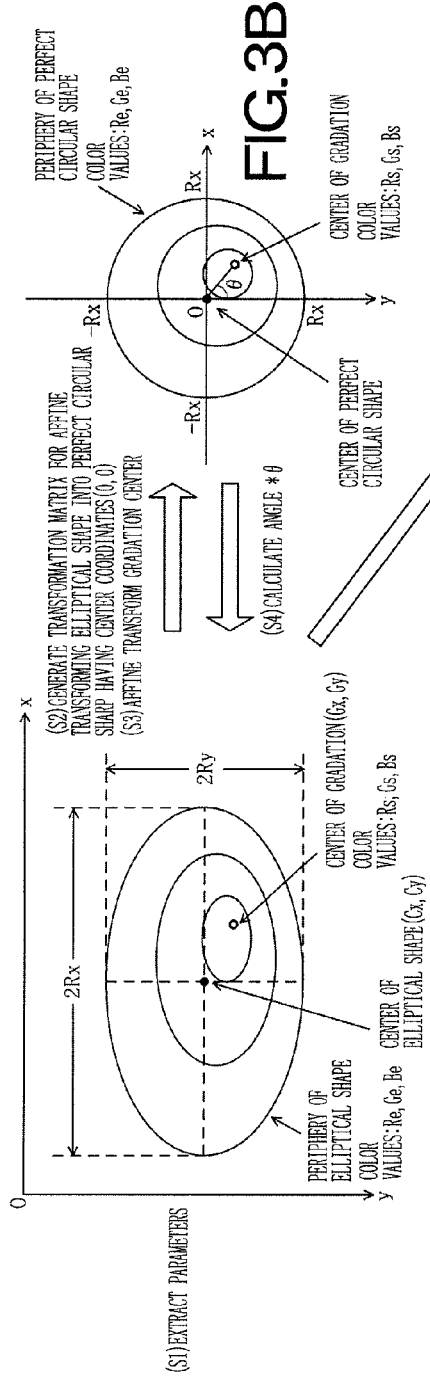
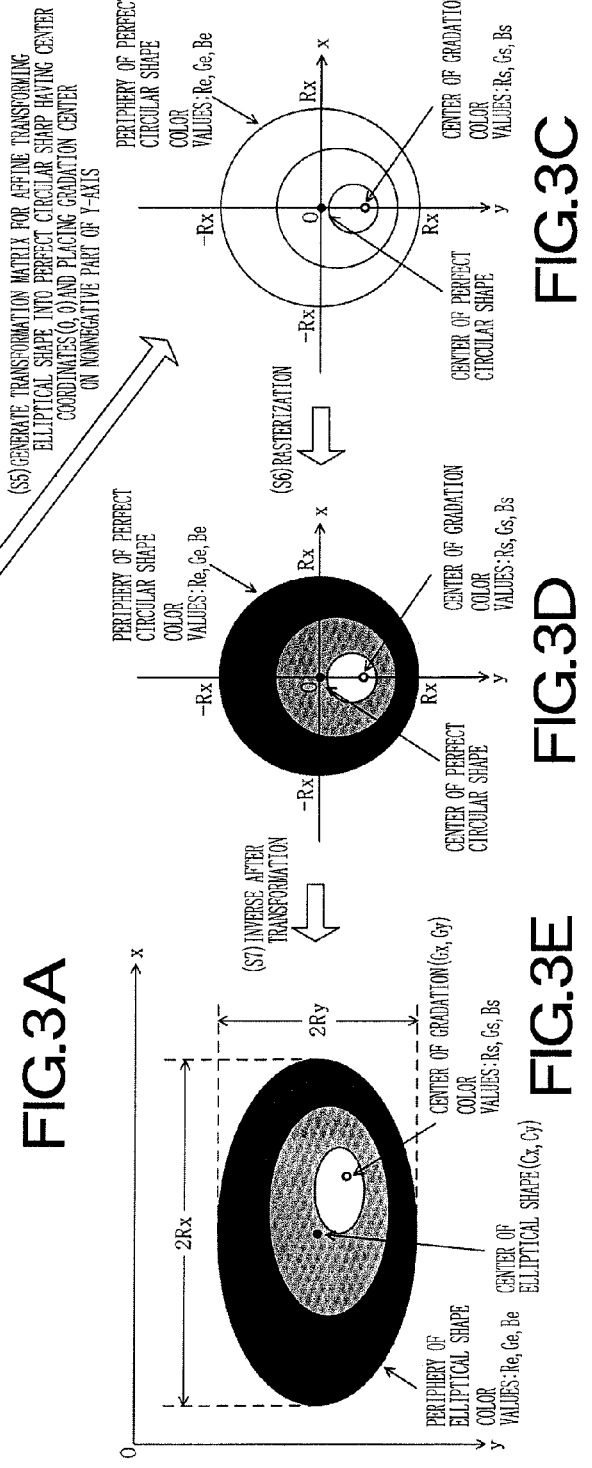
FIG.3A  FIG.3B  FIG.3C  FIG.3D  FIG.3E

IMAGE GENERATING DEVICE, IMAGE GENERATING METHOD AND PRINTING DEVICE

CROSS-REFERENCE TO RELATED APPLICATION

This application claims priority under 35 U.S.C. §119 from Japanese Patent Application No. 2008-093263 filed on Mar. 31, 2008. The entire subject matter of the application is incorporated herein by reference.

BACKGROUND

1. Technical Field

The present invention relates to an image generating device, an image generating method and a printing device.

2. Prior Art

With the evolving high performance of document preparation systems and document printing systems using computers in recent years, there are increasing desires of users for realizing complicated expression in drawing. For example, gradation (gradually changing the color in a prescribed drawing area) is being used a lot for effective presentation, for expressing three-dimensional shapes, etc.

In order to print such a gradation (i.e. an image having gradation) with a printer or display such a gradation on a display, it is necessary to generate a gradation pattern in the bitmap format and draw the gradation pattern on a page memory or frame memory.

In conventional techniques, the drawing of a gradation is carried out by successively drawing (overlaying) multiple areas slightly differing in the color value while gradually shifting the drawing position of each area. For example, in order to draw a gradation in which the color changes smoothly in a pattern like concentric circles, a large circle is drawn first and filled in with a prescribed color. Subsequently, a slightly smaller circle is drawn in (overlaid on) the previously drawn (filled) circle and filled in with a different color. The process is repeated many times until the drawing position (currently drawn circle) gets close enough to the center of the concentric circles (see Japanese Patent Provisional Publication No. HEI 11-31231 (hereinafter referred to as a "patent document #1"), for example).

SUMMARY OF THE INVENTION

However, the gradation drawing method described in the patent document #1 requires repeated execution of the fill-in process (filling in a circle with a specified color) and that leads to a heavy processing load regarding the gradation drawing.

The present invention, which has been made in consideration of the above problems, is advantageous in that an image generating device, an image generating method and a printing device, capable of generating a gradation in which the color value changes from the center of the gradation through multiple areas in a prescribed shape while reducing the load related to the drawing of the gradation, can be provided.

In accordance with an aspect of the present invention, there is provided an image generating device for generating an image including a gradation, in which a color changes from a center of the gradation through annular areas, according to an image drawing instruction. The image generating device includes an extraction unit that extracts gradation pattern parameters specifying a gradation pattern of the gradation from the image drawing instruction, an area determination unit that determines the annular areas, each of the annular areas having a prescribed width, based on the gradation pattern parameters, and a drawing unit that draws the annular areas, wherein each annular area is drawn in one color and the colors in annular areas are different from each other.

According to further aspects of the invention, there is provided a printing device comprising an image generating unit which generates an image including a gradation, in which a color changes from a center of the gradation through annular areas, according to an image drawing instruction and a printing unit that prints the image generated by the image generating unit on a print medium. The image generating unit includes an extraction unit that extracts gradation pattern parameters specifying a gradation pattern of the gradation from the image drawing instruction, an area determination unit that determines the annular areas, each of the annular areas having a prescribed width, based on the gradation pattern parameters; and a drawing unit that draws the annular areas, wherein each annular area is drawn in one color and the colors in annular areas are different from each other.

According to further aspects of the invention, there is provided an image generating method for generating an image including a gradation, in which a color changes from a center of the gradation through annular areas, according to an image drawing instruction. The method includes an extraction step of extracting gradation pattern parameters specifying a gradation pattern of the gradation from the image drawing instruction, an area determination step of determining the annular areas, each of the annular areas having a prescribed width, based on the gradation pattern parameters, and drawing step of drawing the annular areas, wherein each annular area is drawn in one color and the colors in annular areas area different from each other.

Other objects, features and advantages of the present invention will become more apparent from the consideration of the following detailed description taken in conjunction with the accompanying drawings.

BRIEF DESCRIPTION OF THE ACCOMPANYING DRAWINGS

FIG. 2A is a schematic diagram showing an example of a RadialGradientBrush element and parameters specified by the element.

FIG. 2B is a schematic diagram showing an example of an elliptical radial gradation which is drawn according to the parameters specified by the RadialGradientBrush element.

FIGS. 3A-3E are schematic diagrams for explaining principles for drawing an elliptical radial gradation.

DETAILED DESCRIPTION OF THE EMBODIMENTS

Figure 1:
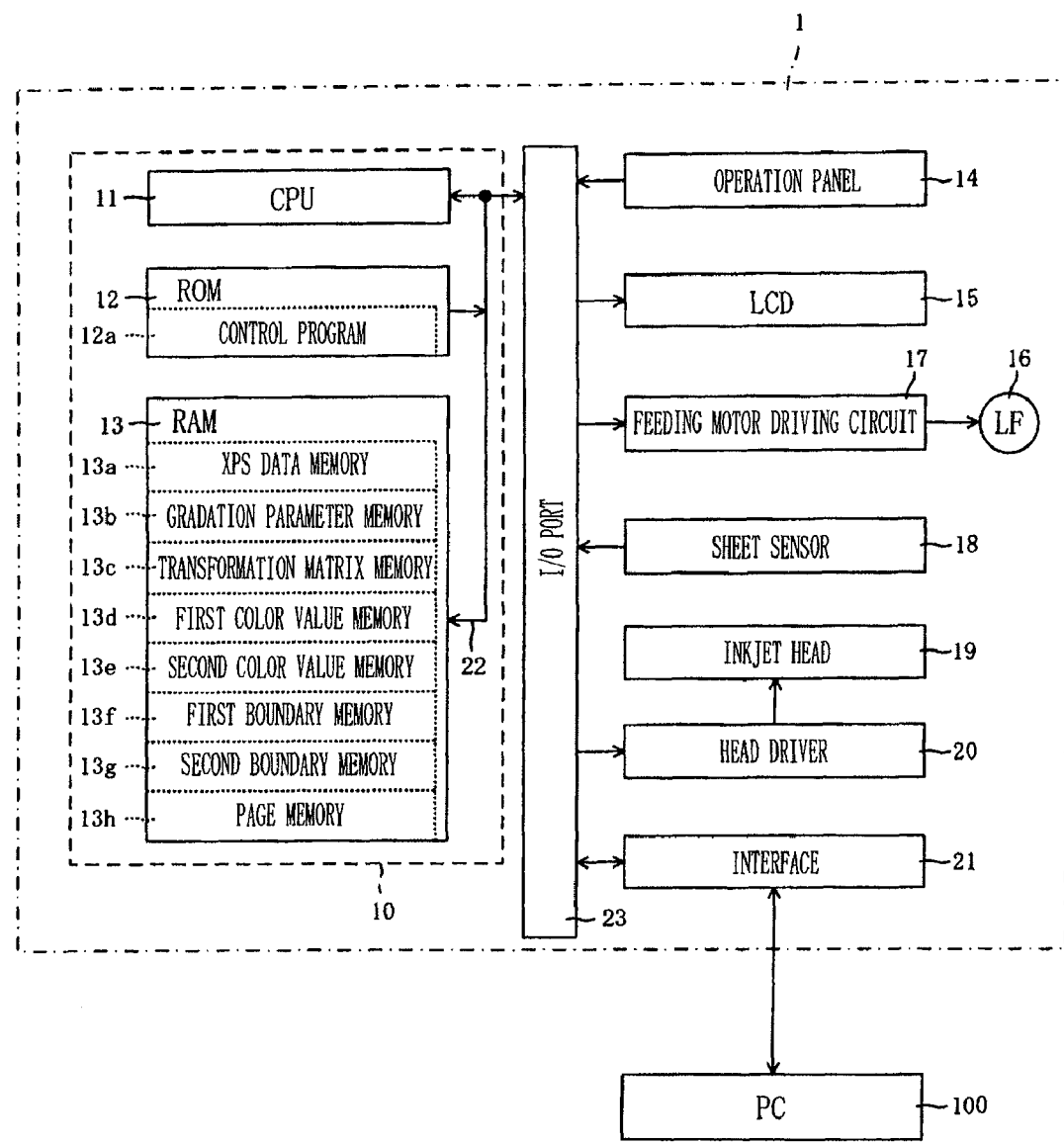
FIG. 1 is a block diagram showing the electrical configuration of a printer (including a printer control unit) in accordance with a first embodiment of the present invention.

Referring now to the drawings, a description will be given in detail of preferred embodiments in accordance with the present invention.

Embodiment 1

FIG. 1 is a block diagram showing the electrical configuration of a printer 1 (including a printer control unit 10) in accordance with a first embodiment of the present invention.

The printer 1 (inkjet printer equipped with an inkjet head 19) is a peripheral device for executing printing by discharging ink drops from nozzles of the inkjet head 19 toward a sheet (e.g. paper). The printer control unit 10 is a unit for controlling the overall operation of the printer 1 while generating image data to be printed by the printer 1.

The printer 1 is connected to a PC (Personal Computer) 100 via a communication cable or wireless communication. When a print command transmitted from the PC 100 is received, an electronic document described according to XPS (XML Paper Specification) (hereinafter referred to as an "XPS document") transmitted from the PC 100 together with the print command is analyzed and image data according to the XPS document is generated by the printer control unit 10, and then an image according to the generated image data is printed on a sheet by the inkjet head 19.

In this case, if a RadialGradientBrush element (an image drawing instruction ordering the drawing of an elliptical radial gradation) is included in the XPS document, an elliptical radial gradation specified by the RadialGradientBrush element is generated by the printer control unit 10 of the printer 1.

The printer control unit 10 is configured to be capable of generating the radial gradation while reducing the load related to the drawing of the radial gradation. Incidentally, the "elliptical radial gradation" means a gradation (i.e. an image having gradation) in an elliptical shape in which the color value changes radially (with multiple elliptical areas in each of which a uniform color value is used for the drawing) from the center of the gradation to the periphery of the elliptical shape.

Next, the detailed configuration of the printer 1 of this embodiment will be described below. As shown in FIG. 1, the printer 1 is equipped with an operation panel 14, an LCD (Liquid Crystal Display) 15, a feeding motor (LF motor) 16, a feeding motor driving circuit 17, a sheet sensor 18, the inkjet head 19, a head driver 20 and an interface 21, as well as the printer control unit 10.

Among the components, the operation panel 14, the LCD 15, the feeding motor driving circuit 17, the sheet sensor 18, the head driver 20 and the interface 21 are connected to the printer control unit 10 via an I/O port 23. The feeding motor 16 is connected to the feeding motor driving circuit 17. The inkjet head 19 is connected to the head driver 20.

The printer control unit 10 includes a CPU (Central Processing Unit) 11, a ROM (Read Only Memory) 12 and a RAM (Random Access Memory) 13, which are connected together by a bus line 22. The bus line 22 is connected to the I/O port 23, via which signals are communicated between the printer control unit 10 and each component connected to the I/O port 23.

The CPU 11 is a processor for controlling the printer 1 and generating image data to be printed by the printer 1 according to programs and fixed values (data) stored in the ROM 12 and the RAM 13, various signals received from the PC 100 via the interface 21, etc.

The ROM 12 is a non-rewritable nonvolatile memory storing a control program 12a to be executed by the CPU 11, fixed values to be referred to by the control program 12a, etc. Programs necessary for executing a printing process (shown in a flow chart of FIG. 6), an elliptical radial gradation rasterization process (shown in a flow chart of FIG. 7) and a perfect circular radial gradation rasterization process (shown in a flow chart of FIG. 8) are included in the control program 12a.

The program for the printing process (flow chart of FIG. 6) is run by the CPU 11 when a print command is received from the PC 100 via the interface 21, by which data received from the PC 100 together with the print command (e.g. XPS document) is analyzed and an image (image data) according to the data is generated.

Meanwhile, the program for the elliptical radial gradation rasterization process (flow chart of FIG. 7) is run by the CPU 11 as a subroutine of the program for the printing process (FIG. 6) in cases where an XPS document is received from the PC 100 and the received XPS document includes a RadialGradientBrush element as an instruction for drawing an elliptical radial gradation.

By running the program for the elliptical radial gradation rasterization process (FIG. 7), the CPU 11 generates a transformation matrix for affine transformation of an elliptical shape specified by the RadialGradientBrush element into a perfect circular shape (with its center placed on the origin) and then draws a radial gradation (perfect circular radial gradation) for (in) the perfect circular shape. Incidentally, the "perfect circular radial gradation" means a gradation (i.e. an image having gradation) in a perfect circular shape in which the color value changes radially (with multiple perfect circular areas in each of which a uniform color value is used for the drawing) from the center of the gradation to the periphery of the perfect circular shape. The CPU 11 calculates the inverse matrix of the generated transformation matrix, and then generates the elliptical radial gradation specified by the RadialGradientBrush element by inversely affine transforming the perfectly circular shape (in which the gradation has been drawn) by use of the inverse matrix. The details of the principles for the drawing of the elliptical radial gradation employed in this embodiment will be explained later with reference to FIGS. 3A-3E.

Meanwhile, the program for the perfect circular radial gradation rasterization process (flow chart of FIG. 8) is run by the CPU 11 as a subroutine of the program for the elliptical radial gradation rasterization process (FIG. 7) when a radial gradation is drawn for the perfect circular shape obtained by the affine transformation of the elliptical shape.

By running the program for the perfect circular radial gradation rasterization process (FIG. 8), the CPU 11 extracts parameters specifying a gradation pattern of the perfect circular radial gradation to be drawn, determines each annular area to be drawn in one color with a uniform color value, and draws each determined annular area in one color with a corresponding color value.

In the perfect circular radial gradation rasterization process, a radial gradation is drawn for (in) the perfect circular shape by conducting the determination and the drawing of each annular area successively from the periphery of the perfect circular shape toward the center of the gradation. The details of the principles for the drawing of the perfect circular radial gradation employed in this embodiment will be explained later with reference to FIG. 4 and FIGS. 5A-5F.

The RAM 13 is a rewritable volatile memory for temporarily storing various data. Storage areas such as an XPS data memory 13a, a gradation parameter memory 13b, a transformation matrix memory 13c, a first color value memory 13d, a second color value memory 13e, a first boundary memory 13f, a second boundary memory 13g and a page memory 13h are reserved in the RAM 13.

The XPS data memory 13a is memory (storage area) for temporarily storing the XPS document received from the PC 100 together with the print command. Upon reception of an XPS document from the PC 100, the interface 21 transfers the received XPS document to the XPS data memory 13a of the RAM 13 by means of DMA (Direct Memory Access), by which the XPS document received from the PC 100 is stored in the XPS data memory 13a.

The XPS document stored in the XPS data memory 13a is read out and the contents of the XPS document are analyzed by the CPU 11 when the printing process (see FIG. 6, explained later) is executed. The CPU 11 generates image data to be printed by the printer 1 by executing an image drawing process according to the contents of the XPS document, and stores the generated image data in the page memory 13h.

The gradation parameter memory 13b is memory for storing parameters regarding the elliptical radial gradation and parameters regarding the perfect circular radial gradation (i.e. the radial gradation in the perfect circular shape obtained by the affine transformation of the elliptical shape).

When a RadialGradientBrush element (an image drawing instruction ordering the drawing of an elliptical radial gradation) is included in the XPS document stored in the XPS data memory 13a, the CPU 11 executes the elliptical radial gradation rasterization process (FIG. 7) as a step of the printing process (FIG. 6), in which elliptical shape parameters (specifying an elliptical shape) and gradation pattern parameters (specifying a gradation pattern to be drawn in the elliptical shape) are extracted from the RadialGradientBrush element. The extracted elliptical shape parameters and gradation pattern parameters are stored in the gradation parameter memory 13b. The details of the RadialGradientBrush element included in an XPS document and the parameters included in the element will be explained later with reference to FIGS. 2A and 2B.

Among the parameters stored in the gradation parameter memory 13b, the elliptical shape parameters (specifying an elliptical shape) are used for generating the transformation matrix for the affine transformation of the elliptical shape into the perfect circular shape (with its center placed on the origin).

Among the parameters stored in the gradation parameter memory 13b, gradation center coordinates (see FIGS. 2A and 2B) included in the gradation pattern parameters (specifying a gradation pattern to be drawn in the elliptical shape) are affine transformed by use of the above transformation matrix.

The gradation center coordinates after undergoing the affine transformation and the radius and center coordinates of the perfect circular shape obtained by the affine transformation of the elliptical shape are also stored in the gradation parameter memory 13b.

In the perfect circular radial gradation rasterization process (FIG. 8), the CPU 11 generates the perfect circular radial gradation (a radial gradation in the perfect circular shape obtained by the affine transformation of the elliptical shape) based on the parameters stored in the gradation parameter memory 13b.

The transformation matrix memory 13c is memory for storing the transformation matrix for the affine transformation from the elliptical shape (specified by the RadialGradientBrush element in the XPS document) into the perfect circular shape. By executing the elliptical radial gradation rasterization process (see FIG. 7, explained later), the CPU 11 generates the transformation matrix for the affine transformation from the elliptical shape into the perfect circular shape (with its center placed on the origin) based on the elliptical shape parameters stored in the gradation parameter memory 13b and then stores the generated transformation matrix in the transformation matrix memory 13c.

The transformation matrix stored in the transformation matrix memory 13c is used for the affine transformation of the gradation center coordinates (see FIGS. 2A and 2B) included in the gradation pattern parameters stored in the gradation parameter memory 13b.

In this case, if the gradation center coordinates after the affine transformation are not on a nonnegative part of the Y-axis, the CPU 11 generates a new transformation matrix by adding a rotational element to the original transformation matrix so that the gradation center coordinates after the affine transformation will be placed on the nonnegative part of the Y-axis. The newly generated transformation matrix is stored in the transformation matrix memory 13c by overwriting the original transformation matrix. The rotational element (which is added to the original transformation matrix) will be explained later with reference to FIGS. 3A-3E.

The gradation center coordinates (see FIGS. 2A and 2B) of the elliptical radial gradation stored in the gradation parameter memory 13b are affine transformed again by use of the transformation matrix finally stored in the transformation matrix memory 13c (i.e. the transformation matrix to which the rotational element has been added). The gradation center coordinates after undergoing the affine transformation are stored in the gradation parameter memory 13b as gradation center coordinates of the perfect circular radial gradation.

The transformation matrix finally stored in the transformation matrix memory 13c (i.e. the transformation matrix to which the rotational element has been added) is referred to by the CPU 11 for calculating its inverse matrix. Then, the elliptical radial gradation specified by the RadialGradientBrush element is generated by the CPU 11 by inversely affine transforming the perfect circular shape (in which the gradation has been drawn) by use of the calculated inverse matrix.

The first color value memory 13d and the second color value memory 13e are used in the perfect circular radial gradation rasterization process (FIG. 8) for storing color values of the annular areas when the annular areas are determined successively from the periphery of the perfect circular shape toward the center of the gradation.

In the perfect circular radial gradation rasterization process, the CPU 11 calculates coordinates of an inner boundary line of an annular area to be determined, calculates a color value (red/green/blue color values) for the drawing of an immediately inner annular area adjoining the former annular area, and temporarily stores the calculated color value in the second color value memory 13e. Meanwhile, in the first color value memory 13d, the color value (red/green/blue color values) of the former annular area (for which the inner boundary line coordinates have been calculated) has been stored. The CPU 11 reads out the color value from the first color value memory 13d and draws the (former) annular area in one color with the color value.

After finishing the drawing of the (former) annular area, the CPU 11 copies the color value of the immediately inner annular area (stored in the second color value memory 13e) into the first color value memory 13d, which allows the CPU 11 to determine the color value of the immediately inner annular area by reading out the color value from the first color value memory 13d at the point when the immediately inner annular area has been determined.

The first boundary memory 13f and the second boundary memory 13g are used in the perfect circular radial gradation rasterization process (FIG. 8) for storing coordinates specifying the outer and inner boundary lines of an annular area when the annular areas are determined successively from the periphery of the perfect circular shape toward the center of the gradation.

In the perfect circular radial gradation rasterization process, the CPU 11 calculates the coordinates of the inner boundary line of an annular area to be determined, and stores the calculated inner boundary line coordinates in the second boundary memory 13g.

Meanwhile, the first boundary memory 13f stores coordinates of the inner boundary line of an immediately outer annular area adjoining the annular area to be determined, that is, coordinates of the outer boundary line of the annular area to be determined. Thus, the CPU 11 specifies an area sandwiched between the outer boundary line coordinates stored in the first boundary memory 13f and the inner boundary line coordinates stored in the second boundary memory 13g as the annular area to be determined.

After drawing the specified (determined) annular area in one color with the color value read out from the first color value memory 13d, the CPU 11 copies the inner boundary line coordinates stored in the second boundary memory 13g into the first boundary memory 13f, which thereafter allows the CPU 11 to refer to the boundary line coordinates stored in the first boundary memory 13f as the outer boundary line coordinates of the immediately inner annular area.

The page memory 13h is memory for storing the image data to be printed by the printer 1 (generated by the printer control unit 10) in the bitmap format. The elliptical radial gradation generated by the elliptical radial gradation rasterization process (FIG. 7) and other image data generated according to the data (e.g. XPS document) are rasterized on the page memory 13h.

When the image data to be printed by the printer 1 has been rasterized on the page memory 13h by the printing process (FIG. 6) according to the data received from the PC 100 together with the print command, the CPU 11 drives the feeding motor driving circuit 17 and the head driver 20 and thereby prints an image corresponding to the image data stored in (rasterized on) the page memory 13h on a sheet (e.g. paper).

The operation panel 14 is a user interface including input buttons for letting the user make printer settings, input instructions, etc. The LCD 15 is a display device for displaying a variety of information (menu, operating status of the printer 1, etc.) depending to the user operation on the operation panel 14.

The feeding motor (LF motor) 16 is a stepping motor for feeding a sheet (placed at a prescribed position in/on the printer 1) downstream or upstream in the feeding direction. Driving control of the feeding motor 16 is executed by the feeding motor driving circuit 17 according to instructions from the CPU 11. By the driving of the feeding motor 16, the sheet is fed to the lower surface of the inkjet head 19 (to face the tips of the nozzles).

The inkjet head 19, as a print head having multiple nozzles (unshown) and actuators (unshown), is equipped with four inkjet head units corresponding to four color inks (cyan, magenta, yellow, black). The head driver 20 is a driving circuit for driving the actuators of the inkjet head 19.

The CPU 11 generates multivalued data corresponding to the four color inks (cyan, magenta, yellow, black) based on the image data stored in the page memory 13h and sends the generated multivalued data to the head driver 20 via a gate array (unshown). The head driver 20 generates driving pulses corresponding to the multivalued data supplied from the CPU 11 and applies the driving pulses to the actuators corresponding to the nozzles, by which ink drops are selectively discharged from the nozzles and an image corresponding to the image data stored in the page memory 13h is printed on a sheet.

The interface 21 is a unit for controlling data communication between the printer 1 and the PC 100. The printer 1 receives the print command and the data specifying the image to be printed (e.g. XPS document) from the PC 100 via the interface 21.

Upon reception of a print command from the PC 100, the interface 21 sends an interrupt signal (for reporting the reception of the print command) to the CPU 11. Upon reception of an XPS document from the PC 100, the interface 21 transfers the received XPS document to the XPS data memory 13a in the RAM 13 by means of DMA (Direct Memory Access).

In the following, the details of the RadialGradientBrush element included in an XPS document will be explained referring to FIGS. 2A and 2B. FIG. 2A is a schematic diagram showing an example of the RadialGradientBrush element and parameters specified by the element. FIG. 2B is a schematic diagram showing an example of an elliptical radial gradation which is drawn according to the parameters specified by the RadialGradientBrush element.

As shown in FIG. 2A, the RadialGradientBrush element is made up of a plurality of attributes and sub-elements. Among the attributes and sub-elements, a "Center" attribute 31, a "RadiusX" attribute 33 and a "RadiusY" attribute 34 give the elliptical shape parameters (specifying an elliptical shape). Meanwhile, a "GradientOrigin" attribute 32 and a RadialGradientBrush.GradientStops element 35 give the gradation pattern parameters (specifying a gradation pattern to be drawn in the elliptical shape).

The "Center" attribute 31 specifies the coordinates (Cx, Cy) of the center of the elliptical shape shown in FIG. 2B. Here, the "center of the elliptical shape" means a point where the major axis and the minor axis of the elliptical shape intersect with each other.

The "GradientOrigin" attribute 32 specifies the coordinates (Gx, Gy) of the center of the gradation shown in FIG. 2B (i.e. the gradation center coordinates). Here, the "center of the gradation" means a point where the color variation in the radial gradation starts (i.e. starting point of the gradation).

The radial gradation is expressed so that its color gradually changes from its center to points on the periphery of the elliptical shape specified by the RadialGradientBrush element (as endpoints of the color variation in the gradation (endpoints of the gradation)).

Incidentally, the parameters given by the "Center" attribute 31 and the "GradientOrigin" attribute 32 are described in terms of an orthogonal coordinate system represented by two coordinate axes (X-axis, Y-axis) intersecting with each other at right angles at an origin defined at the upper left corner of a printing area specified by the XPS document (see FIG. 2B).

In this orthogonal coordinate system, the (positive) X-axis extends in the horizontal direction of the printing area (from left to right), while the (positive) Y-axis extends in the vertical direction of the printing area (from top to bottom).

In the example of the RadialGradientBrush element shown in FIG. 2A, the center coordinates of the elliptical shape are specified as (150, 150) by the "Center" attribute 31, while the center coordinates of the gradation is specified as (200, 170) by the "GradientOrigin" attribute 32.

Meanwhile, the "RadiusX" attribute 33 specifies the radius Rx of the elliptical shape in the X-axis direction (hereinafter referred to as an "X-radius"), and the "RadiusY" attribute 34 specifies the radius Ry of the elliptical shape in the Y-axis direction (hereinafter referred to as a "Y-radius").

Incidentally, the major/minor axes of the elliptical shape (specified by the parameters of the "RadiusX" attribute 33 and the "RadiusY" attribute 34) are set in the X-axis direction and Y-axis direction.

Therefore, the smaller of Rx or Ry represents the minor axis radius of the elliptical shape, while the larger of Rx or Ry represents the major axis radius of the elliptical shape. As shown in FIG. 2B, the lengths of the elliptical shape in the X-axis direction and Y-axis direction are 2Rx and 2Ry, respectively.

In the example of the RadialGradientBrush element shown in FIG. 2A, the X-radius is specified as "140" by the "RadiusX" attribute 33, and the Y-radius is specified as "100" by the "RadiusY" attribute 34.

Meanwhile, the RadialGradientBrush.GradientStops element 35 gives parameters specifying color values of the gradation. The element 35 includes two sub-elements: GradientStop elements 35a and 35b. Each GradientStop element (35a, 35b) includes a "Color" attribute and an "Offset" attribute.

The "Color" attribute specifies color values of red, green and blue at the point specified by the "Offset" attribute. In the "Color" attribute, the color values are described as a six-digit hexadecimal number, in which the most significant two digits specify the red color value (Rs or Re), the next two digits specify the green color value (Gs or Ge), and the least significant two digits specify the blue color value (Bs or Be).

The "Offset" attribute specifies the point having the color values specified by the "Color" attribute. For example, when the value of the "Offset" attribute is "0", it means that the color values specified by the "Color" attribute are those at the center (starting point) of the gradation. When the value of the "Offset" attribute is "1", it means that the color values specified by the "Color" attribute are those at the points on the periphery of the elliptical shape specified by the RadialGradientBrush element (i.e. at the endpoints of the gradation).

Therefore, the color values (Rs, Gs, Bs) of red, green and blue at the center (starting point) of the gradation (see FIG. 2B) are specified by the GradientStop element 35a, while the color values (Re, Ge, Be) of red, green and blue at the points on the periphery of the elliptical shape (i.e. at the endpoints of the gradation) (see FIG. 2B) are specified by the GradientStop element 35b.

In the example of the RadialGradientBrush element shown in FIG. 2A, the red/green/blue color values (Rs, Gs, Bs) at the center (starting point) of the gradation are specified as $(FF)_{16}$, $(FF)_{16}$ and $(00)_{16}$ by the GradientStop element 35a.

Meanwhile, the red/green/blue color values (Re, Ge, Be) at the points on the periphery of the elliptical shape (i.e. at the endpoints of the gradation) are specified as $(00)_{16}$, $(00)_{16}$ and $(FF)_{16}$ by the GradientStop element 35b. Incidentally, the value "$(FF)_{16}$" represents "FF" in the hexadecimal notation ("255" in the decimal notation) and the value "$(00)_{16}$" represents "00" in the hexadecimal notation ("0" in the decimal notation).

With the RadialGradientBrush element including such attributes and sub-elements, the drawing position of the elliptical shape in the printing area is determined from (specified by) the center coordinates (Cx, Cy) of the elliptical shape given by the "Center" attribute 31, and the shape and size of the periphery of the elliptical shape are determined from (specified by) the X-radius and the Y-radius of the elliptical shape given by the "RadiusX" attribute 33 and the "RadiusY" attribute 34, as shown in FIG. 2B. From the above information, the positions of the points on the periphery of the elliptical shape in the printing area are determined.

Meanwhile, the position of the center of the gradation in the printing area is determined (specified) by the gradation center coordinates (Gx, Gy) given by the "GradientOrigin" attribute 32.

The gradation pattern in the elliptical shape is determined by interpolation by use of the red/green/blue color values (Rs, Gs, Bs) at the center (starting point) of the gradation specified by the GradientStop element 35a and the red/green/blue color values (Re, Ge, Be) at the points on the periphery of the elliptical shape (i.e. at the endpoints of the gradation) specified by the GradientStop element 35b, depending on the distance between the center of the gradation and each point on the periphery of the elliptical shape.

In the following, the principles for the drawing of the elliptical radial gradation employed in this embodiment will be explained referring to FIGS. 3A-3E. FIGS. 3A-3E are schematic diagrams for explaining the principles for the drawing of the elliptical radial gradation. In the following explanation, the 3×3 matrix shown below will be expressed as (a, b, c, d, e, f).

$$(a, b, c, d, e, f) = \begin{pmatrix} a & b & 0 \\ c & d & 0 \\ e & f & 1 \end{pmatrix}$$

In this embodiment, when the data received from the PC 100 together with a print command is an XPS document and the XPS document includes a RadialGradientBrush element, the printer control unit 10 (CPU 11) first extracts the parameters shown in FIG. 3A, that is, the elliptical shape parameters specifying an elliptical shape (i.e. the center coordinates (Cx, Cy), the X-radius Rx and the Y-radius Ry of the elliptical shape) and the gradation pattern parameters specifying a gradation pattern to be drawn in the elliptical shape (i.e. the center coordinates (Gx, Gy) of the gradation, the color values (Rs, Gs, Bs) at the center (starting point) of the gradation and the color values (Re, Ge, Be) at the periphery of the elliptical shape (endpoints of the gradation)), from the RadialGradientBrush element (S1 in FIG. 3A).

Incidentally, FIG. 3A is a schematic diagram (almost identical with FIG. 2B) showing an example of an elliptical radial gradation which is drawn according to the parameters specified by the RadialGradientBrush element.

Subsequently, the CPU 11 generates a transformation matrix A for affine transforming the elliptical shape shown in FIG. 3A into the perfect circular shape shown in FIG. 3B (whose radius is Rx and whose center coordinates are (0, 0)) by use of the extracted elliptical shape parameters, according to the following equation (1) (S2 in FIG. 3B):

$$A=(1,0,0,Rx/Ry,-Cx,-(Rx/Ry)\cdot Cy) \quad (1)$$

Incidentally, while a case where the elliptical shape shown in FIG. 3A is affine transformed into the perfect circular shape shown in FIG. 3B (having a radius Rx and center coordinates (0, 0)) is explained in this embodiment, the elliptical shape shown in FIG. 3A may also be affine transformed into a perfect circular shape having a radius Ry and center coordinates (0, 0), or into a perfect circular shape having a radius R (arbitrary value) and center coordinates (0, 0). In the former case, the transformation matrix A is generated according to the following equation (2). In the latter case, the transformation matrix A is generated according to the following equation (3).

$$A=(Ry/Rx,0,0,1,-(Ry/Rx)\cdot Cx,-Cy) \quad (2)$$

$$A=(R/Rx,0,0,R/Ry,-(R/Rx)\cdot Cx,-(R/Ry)\cdot Cy) \quad (3)$$

Subsequently, the CPU 11 affine transforms the gradation center coordinates (Gx, Gy) shown in FIG. 3A using the transformation matrix A generated by the equation (1) (S3 in FIG. 3B). Then, the CPU 11 judges whether the center of the gradation after the affine transformation (see FIG. 3B) is on the nonnegative part of the Y-axis or not. If the gradation center after the affine transformation is not on the nonnegative part of the Y-axis, the CPU 11 calculates an angle θ between the positive Y-axis and a line segment connecting the origin (0, 0) and the gradation center (see FIG. 3B) (S4 in FIG. 3B).

Subsequently, the CPU 11 generates a transformation matrix B1 for rotation around the origin by the angle θ (affine transformation) according to the following equation (4), and then generates a transformation matrix B (i.e. the transformation matrix A to which a rotational element has been added) by multiplying the transformation matrix A by the transformation matrix B1 as shown in the following equation (5) (S5 in FIG. 3C).

$$B1=(\cos θ, \sin θ, -\sin θ, \cos θ, 0, 0) \quad (4)$$

$$B=A\cdot B1 \quad (5)$$

On the other hand, if the gradation center after the affine transformation using the transformation matrix A generated by the equation (1) is on the nonnegative part of the Y-axis, the transformation matrix A of the equation (1) is directly used as the transformation matrix B.

Subsequently, the CPU 11 affine transforms the gradation center coordinates (Gx, Gy) shown in FIG. 3A again by use of the transformation matrix B, by which the elliptical shape shown in FIG. 3A is transformed into a perfect circular shape having a radius Rx and center coordinates (0, 0) and the gradation center is placed on the nonnegative part of the Y-axis as shown in FIG. 3C.

Subsequently, the CPU 11 executes a rasterization process for drawing a radial gradation for (in) the perfect circular shape shown in FIG. 3C (S6 in FIG. 3C). Specifically, the CPU 11 generates a radial gradation shown in FIG. 3D so that the red/green/blue color values in the gradation gradually change from the values (Rs, Gs, Bs) at the starting point of the gradation (i.e. the gradation center after the affine transformation placed on the nonnegative part of the Y-axis) to the values (Re, Ge, Be) at the endpoints of the gradation (i.e. the periphery of the perfect circular shape).

The rasterization process is completed by storing the generated radial gradation in the perfect circular shape (perfect circular radial gradation) in the RAM 13 in the bitmap format. The details of the perfect circular radial gradation rasterization process will be explained later with reference to FIG. 4 and FIGS. 5A-5F.

Finally, to the perfect circular shape in which the gradation shown in FIG. 3D (stored in the RAM 13) has been drawn, the CPU 11 executes the inverse affine transformation (S7 in FIG. 3D). The inverse affine transformation is executed using a transformation matrix as the inverse of the transformation matrix B (used for the affine transformation of the elliptical shape shown in FIG. 3A into the perfect circular shape shown in FIG. 3C (in which the gradation has been drawn at this point)).

By drawing the gradation in the perfect circular shape obtained by the affine transformation of the elliptical shape (specified by the RadialGradientBrush element) by the transformation matrix B and then executing the inverse affine transformation to the perfect circular shape (in which the gradation has been drawn) by the inverse matrix of the transformation matrix B as above, the elliptical radial gradation specified by the RadialGradientBrush element can be generated as shown in FIG. 3E. The elliptical radial gradation generated as above is stored in the page memory 13h in the bitmap format, by which the rasterization of the elliptical radial gradation is completed.

Next, the details of the perfect circular radial gradation rasterization process (S6 in FIG. 3C) will be explained referring to FIGS. 4 and 5A-5F. While such a radial gradation rasterization process is executed independently for each color (red, green, blue), only a perfect circular radial gradation rasterization process for red will be explained here referring to FIGS. 4 and 5A-5F. The radial gradation rasterization processes for green and blue are identical with the radial gradation rasterization process for red (explained here), and thus illustration and explanation thereof are omitted for brevity.

Figure 4:
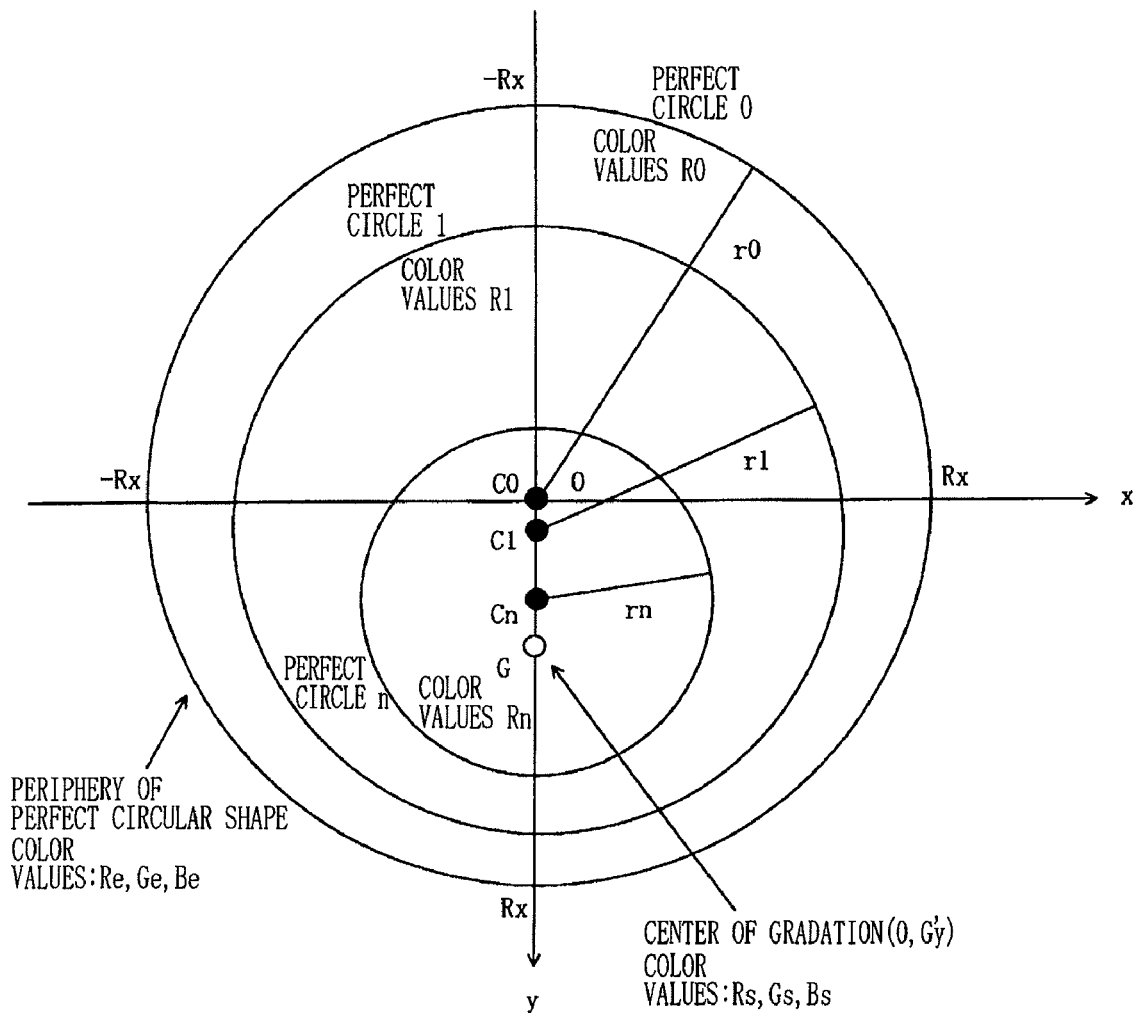
FIG. 4 is a schematic diagram for explaining a method for calculating the color value and boundary line coordinates of each annular area which is determined in the drawing of a perfect circular radial gradation.

FIG. 4 is a schematic diagram for explaining a method for calculating the color value and the boundary line coordinates of each annular area (drawn in one color with a uniform color value) which is determined in the drawing of the perfect circular radial gradation. In this embodiment, the color value of each annular area is calculated assuming that the color value in the perfect circular shape changes from the value Rs (at the center (starting point) of the gradation) to the value Re (at the periphery of the perfect circular shape (endpoints of the gradation)) at a prescribed rate (color value variation k which will be explained later). By calculating the center coordinates and the radius of each of the perfect circles (as the boundaries of the annular areas), the coordinates of each boundary line specified by each perfect circle are obtained.

Specifically, the CPU 11 determines the center coordinates C0 and the radius r0 of the periphery of the perfect circular shape (perfect circle 0) as (0, 0) and Rx, respectively, and then regards the coordinates of (the periphery of) the perfect circle 0 (specified by the center coordinates C0 and the radius r0) as the outer boundary line coordinates of the outermost annular area in the perfect circular shape. Subsequently, the CPU 11 sets the (red) color value of the points on the perfect circle 0 at the value Re at the periphery of the perfect circular shape (endpoints of the gradation) and then sets the color value (R0) of the outermost annular area in the perfect circular shape at (Re−k).

Here, "k" denotes the variation (difference) in the color value between two adjacent annular areas. In this embodiment, the color value variation k is set at a negative value (e.g. −1) when the color value Rs at the gradation center is larger than the color value Re at the periphery of the perfect circular shape, or at a positive value (e.g. +1) when the color value Rs at the gradation center is smaller than the color value Re at the periphery of the perfect circular shape. Incidentally, the absolute value of the color value variation k may be set properly so that the color variation in the gradation looks smooth, in consideration of the human sense, characteristics of the color space, color reproduction performance of the printer 1, etc.

Subsequently, the CPU 11 calculates center coordinates C1 (C1x, C1y) and a radius r1 of an inner perfect circle 1 (serving as the inner boundary line of the outermost annular area in the perfect circular shape and also as the outer boundary line of an immediately inner annular area adjoining the outermost annular area) and a color value R1 of the immediately inner annular area by use of the following equations (6)-(9). From the obtained center coordinates C1 (C1x, C1y) and radius r1, the CPU 11 calculates the coordinates of the boundary line specified by the perfect circle 1.

$$C1x=0 \quad (6)$$

$$C1y=G'y \cdot k/(Re-Rs) \quad (7)$$

$$r1=r0-r0 \cdot k/(Re-Rs) \quad (8)$$

$$R1=Re-2k \quad (9)$$

where "G'y" denotes the Y coordinate of the gradation center after the affine transformation by the transformation matrix B.

Similarly, the CPU 11 calculates the center coordinates and radius of each subsequent (inner) perfect circle 2, 3, . . . , n, . . . (serving as the outer or inner boundary line of each annular area) and the color value of each annular area, and then calculates the coordinates of each boundary line (specified by each perfect circle) based on the center coordinates and radius of each perfect circle. The center coordinates Cn (Cnx, Cny) and the radius rn of each perfect circle n (n can also be 0 or 1) and the color value Rn of each annular area (whose outer boundary line is the perfect circle n) are calculated by use of the following equations (10)-(13):

$$Cnx=0 \quad (10)$$

$$Cny=G'y \cdot n \cdot k/(Re-Rs) \quad (11)$$

$$rn=r0-r0 \cdot n \cdot k/(Re-Rs) \quad (12)$$

$$Rn=Re-(n+1) \cdot k \quad (13)$$

The color value and boundary line coordinates of each annular area (which is determined in the drawing of the perfect circular radial gradation) can be calculated by the above method.

Since the gradation center of the perfect circular radial gradation has been placed on the nonnegative part of the Y-axis by the affine transformation using the transformation matrix B as mentioned above, the X coordinate can be fixed at "0" in the calculation of the center coordinates of each perfect circle serving as a boundary line between annular areas. In other words, the center coordinates of each perfect circle can be calculated as a one-dimensional function (using the Y coordinate only), by which the number of calculations necessary for obtaining the center coordinates can be reduced considerably.

Further, by the placement of the gradation center on the nonnegative part of the Y-axis by the affine transformation by the transformation matrix B, the gradation center after the affine transformation can be fixed at the center of the perfect circular shape or at a position on the positive side of the center of the perfect circular shape.

Next, the flow of the perfect circular radial gradation rasterization process (S6 in FIG. 3C) will be explained below referring to FIGS. 5A-5F. FIGS. 5A-5F are schematic diagrams for explaining the flow of the perfect circular radial gradation rasterization process.

In the perfect circular radial gradation rasterization process of this embodiment, the perfect circular radial gradation is rasterized on the RAM 13 by determining each annular area (to be drawn in one color with a uniform color value) and drawing each determined annular area in one color with a corresponding color value (red/green/blue color values) successively from the periphery of the perfect circular shape toward the center of the gradation.

Figure 5A:
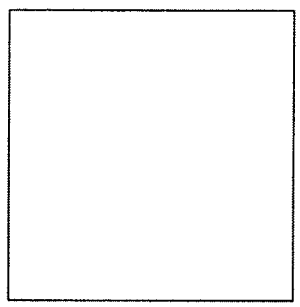
FIGS. 5A-5F are schematic diagrams for explaining the flow of a perfect circular radial gradation rasterization process.

Specifically, the CPU 11 (printer control unit 10) first specifies the periphery of the image area (in which the perfect circular radial gradation is drawn) as the outer boundary line of the outermost annular area (hereinafter referred to as an "annular area #0", which surrounds the aforementioned "outermost annular area in the perfect circular shape") and stores the coordinates of the boundary line in the first boundary memory 13f (FIG. 5A). In this step, the CPU 11 also sets the color value of the annular area #0 at the color value Re at the periphery of the perfect circular shape (endpoints of the gradation) and stores the color value in the first color value memory 13d.

Figure 5B:
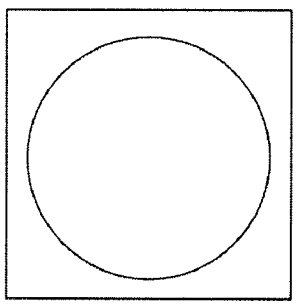

Subsequently, the CPU 11 determines the aforementioned center coordinates C0 and radius r0 of the periphery of the perfect circular shape (perfect circle 0) as (0, 0) and Rx, respectively, calculates the coordinates of the perfect circle 0 based on the center coordinates C0 and the radius r0, and stores the obtained coordinates of the perfect circle 0 in the second boundary memory 13g as the inner boundary line coordinates of the annular area #0 (FIG. 5B).

In this step, the CPU 11 also determines the color value R0 of the next inner annular area adjoining the annular area #0 (hereinafter referred to as an "annular area #1") by subtracting the color value variation k from the color value Re at the periphery of the perfect circular shape (endpoints of the gradation) and stores the determined color value R0=(Re−k) in the second color value memory 13e.

Figure 5C:
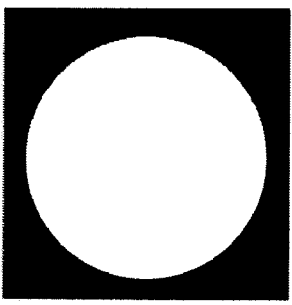

Subsequently, the CPU 11 determines an area sandwiched between the outer boundary line coordinates (of the annular area #0) stored in the first boundary memory 13f and the inner boundary line coordinates (of the annular area #0) stored in the second boundary memory 13g as the annular area #0, and then draws the annular area #0 in one color with the color value stored in the first color value memory 13d (FIG. 5C).

After drawing the annular area #0, the CPU 11 copies the inner boundary line coordinates of the annular area #0 (stored in the second boundary memory 13g) into the first boundary memory 13f as the outer boundary line coordinates of the annular area #1, while also copying the color value of the annular area #1 (stored in the second color value memory 13e) into the first color value memory 13d.

Figure 5D:
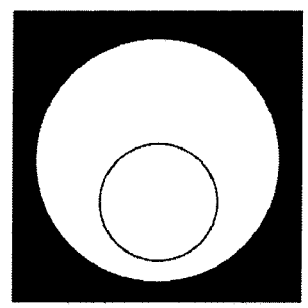

Subsequently, the CPU 11 determines the center coordinates C1 and the radius r1 of the perfect circle 1 (as the inner boundary line of the annular area #1) according to the equations (10)-(12), calculates the coordinates of the perfect circle 1 based on the center coordinates C1 and the radius r1, and stores the obtained coordinates of the perfect circle 1 in the second boundary memory 13g (FIG. 5D).

In this step, the CPU 11 also determines the color value R1 of the next inner annular area adjoining the annular area #1 (hereinafter referred to as an "annular area #2") according to the equation (13) and stores the determined color value R1 in the second color value memory 13e.

Figure 5E:
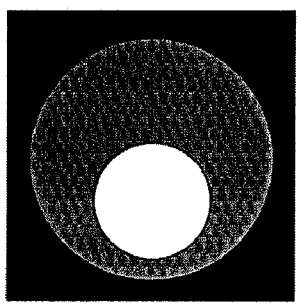

Subsequently, the CPU 11 determines an area sandwiched between the outer boundary line coordinates (of the annular area #1) stored in the first boundary memory 13f and the inner boundary line coordinates (of the annular area #1) stored in the second boundary memory 13g as the annular area #1, and then draws the annular area #1 in one color with the color value stored in the first color value memory 13d (FIG. 5E).

After drawing the annular area #1, the CPU 11 copies the inner boundary line coordinates of the annular area #1 (stored in the second boundary memory 13g) into the first boundary memory 13f as the outer boundary line coordinates of the annular area #2, while also copying the color value of the annular area #2 (stored in the second color value memory 13e) into the first color value memory 13d.

Thereafter, the CPU 11 repeats the steps shown in FIGS. 5D and 5E for subsequent annular areas toward the center of the gradation. At the point when the step of FIG. 5E is finished for an annular area, if the color value of the next inner annular area adjoining the annular area drawn in the step of FIG. 5E (i.e. the color value copied from the second color value memory 13e into the first color value memory 13d) has become equal to the color value Rs at the center (starting point) of the gradation, the process exits from the loop (FIGS. 5D and 5E) and advances to the step shown in FIG. 5F.

Figure 5F:
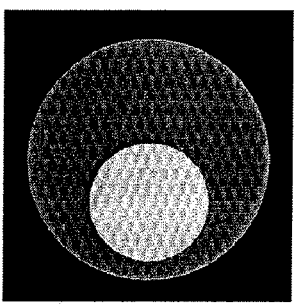

In the step of FIG. 5F, the CPU 11 draws the remaining circular area (inside the boundary line whose coordinates have been copied from the second boundary memory 13g into the first boundary memory 13f) in one color with the color value stored in the first color value memory 13d, that is, the color value Rs at the center (starting point) of the gradation.

By the above process (FIGS. 5A-5F), each annular area (to be drawn in one color with a uniform color value) can be determined and drawn in one color with a corresponding color value successively from the periphery of the perfect circular shape toward the center of the gradation, by which the perfect circular radial gradation can be rasterized on the RAM 13.

Figure 6:
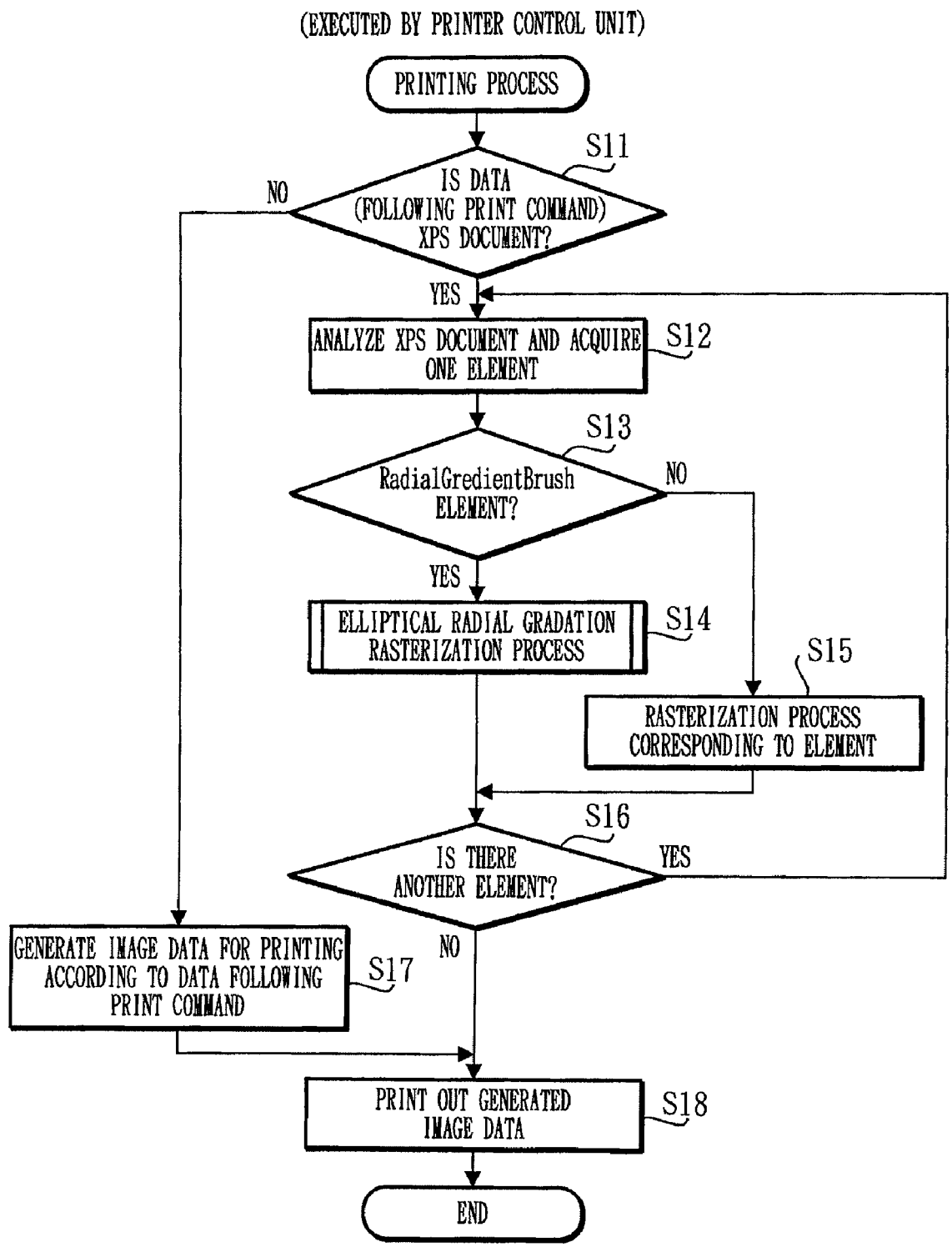
FIG. 6 is a flow chart of a printing process which is executed by the printer control unit.

In the following, the process flow of the printing process executed by the printer control unit 10 (CPU 11) will be described referring to FIG. 6. FIG. 6 is a flow chart of the printing process. The printing process, for generating the image data to be printed by the printer 1 based on the data received (following the print command) from the PC 100 via the interface 21 and printing out the generated image data, is started when the interrupt signal (sent from the interface 21 for informing the CPU 11 of the reception of the print command) is detected by the CPU 11.

At the start of the printing process, the CPU 11 (printer control unit 10) judges whether the data received from the PC 100 following the print command is an XPS document (document described according to XPS) or not (S11). When the data is an XPS document (S11: YES), the CPU 11 reads out the XPS document (which has been transferred from the interface 21 to the XPS data memory 13a by means of DMA (Direct Memory Access)) from the XPS data memory 13a, analyzes the contents of the XPS document, and acquires one element included in the XPS document (S12).

Subsequently, the CPU 11 judges whether the element acquired in S12 is a RadialGradientBrush element or not (S13). When the acquired element is a RadialGradientBrush element (S13: YES), the CPU 11 (judging that the acquired element is an instruction for drawing an elliptical radial gradation) executes the elliptical radial gradation rasterization process (FIG. 7) which will be explained later (S14).

By the elliptical radial gradation rasterization process, the elliptical radial gradation specified by the RadialGradientBrush element can be generated while reducing the load related to the drawing of the elliptical radial gradation. The generated elliptical radial gradation is rasterized on the page memory 13h. After the step S14, the process advances to step S16.

On the other hand, when the element acquired in S12 is not a RadialGradientBrush element (S13: NO), the CPU 11 executes a rasterization process corresponding to the acquired element, stores image data generated by the rasterization process in the page memory 13h (S15), and advances to the step S16.

In the step S16, the CPU 11 judges whether the XPS document still includes an element that has not been extracted (acquired) in S12 yet. When the XPS document includes an element yet to be extracted (S16: YES), the CPU 11 returns to the step S12 to repeat the steps S12-S16 for the next element.

The steps S12-S16 are repeated until all the elements included in the XPS document are extracted in S12 and the rasterization process (S14 or S15) is completed for all the elements (S16: NO), by which the image data specified by the XPS document is rasterized on the page memory 13h.

In this case where all the elements included in the XPS document have been extracted in S12 and the rasterization process (S14 or S15) has been completed for all the elements (S16: NO), the process advances to step S18.

Meanwhile, when the data received from the PC 100 following the print command is not an XPS document in S11 (S11: NO), the CPU 11 generates image data (for printing) according to the contents of the data received following the print command and then stores the generated image data in the page memory 13h (S17). Thereafter, the process advances to the step S18.

In the step S18, the CPU 11 sends signals to the feeding motor driving circuit 17 and the head driver 20 based on the image data generated in S11-S17 and stored in the page memory 13h, by which the feeding motor 16 and the inkjet head 19 are driven and an image according to the image data is printed on a sheet (completion of the printing process of FIG. 6).

By the printing process (FIG. 6) explained above, upon reception of a print command from the PC 100, image data can be generated based on the data following the print command, and an image according to the generated image data can be printed on a sheet.

In the printing process, when an XPS document is received from the PC 100 as the data following the print command, the XPS document is analyzed. When a RadialGradientBrush element is included in the XPS document, the elliptical radial gradation rasterization process (explained below) is executed, by which the printer control unit 10 (CPU 11) is allowed to generate the elliptical radial gradation specified by the RadialGradientBrush element while reducing the load related to the drawing of the elliptical radial gradation.

Figure 7:
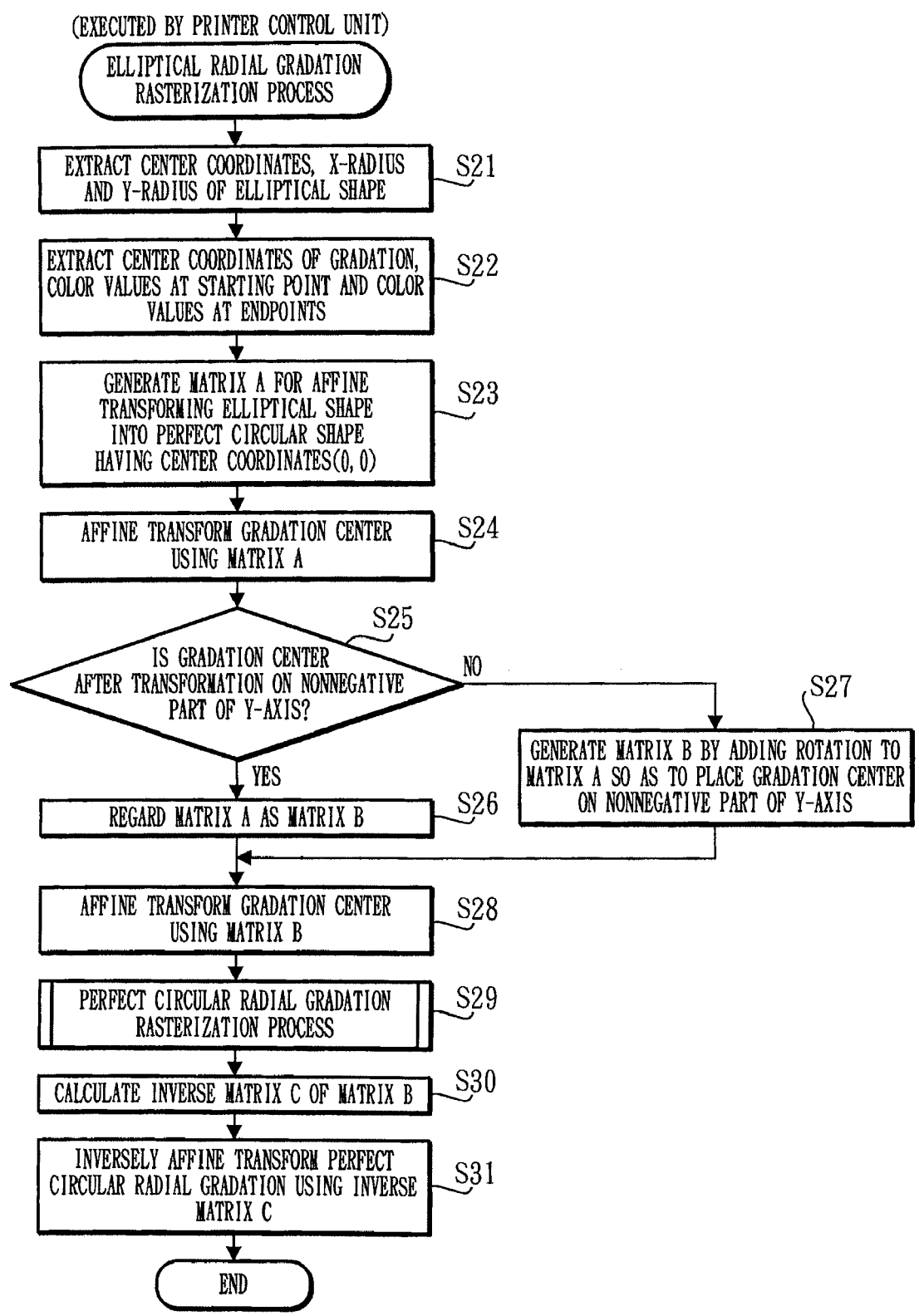
FIG. 7 is a flow chart of an elliptical radial gradation rasterization process which is executed by the printer control unit.

Next, the elliptical radial gradation rasterization process, which is executed by the printer control unit 10 (CPU 11) as the step S14 in FIG. 6, will be explained referring to FIG. 7. FIG. 7 is a flow chart of the elliptical radial gradation rasterization process.

The elliptical radial gradation rasterization process, for generating an elliptical radial gradation specified by a RadialGradientBrush element included in an XPS document, is executed when the data following the print command is an XPS document and a RadialGradientBrush element is included in the elements described in the XPS document in the printing process (FIG. 6) executed by the printer control unit 10 (CPU 11). The elliptical radial gradation rasterization process (FIG. 7) will be explained below while associating it with the aforementioned principles for the drawing of the elliptical radial gradation shown in FIGS. 3A-3E.

At the start of the elliptical radial gradation rasterization process, the CPU 11 (printer control unit 10) extracts the center coordinates (Cx, Cy), the X-radius Rx and the Y-radius Ry of the elliptical shape (see FIGS. 2A and 2B) from the RadialGradientBrush element as the elliptical shape parameters (specifying an elliptical shape) and stores the extracted parameters in the gradation parameter memory 13b (S21).

Subsequently, the CPU 11 extracts the center coordinates (Gx, Gy) of the gradation, the red/green/blue color values (Rs, Gs, Bs) at the center (starting point) of the gradation and the red/green/blue color values (Re, Ge, Be) at the periphery of the elliptical shape (endpoints of the gradation) (see FIGS. 2A and 2B) from the RadialGradientBrush element as the gradation pattern parameters (specifying a gradation pattern to be drawn in the elliptical shape) and stores the extracted parameters in the gradation parameter memory 13b (S22). These steps S21 and S22 correspond to the step S1 shown in FIG. 3A.

Subsequently, the CPU 11 reads out the elliptical shape parameters stored in the gradation parameter memory 13b, generates the transformation matrix A for the affine transformation from the elliptical shape specified by the RadialGradientBrush element (see FIG. 3A) into the perfect circular shape having a radius Rx and center coordinates (0, 0) (see FIG. 3B) by use of the equation (1), and stores the generated transformation matrix A in the transformation matrix memory 13c (S23). This steps S23 correspond to the step S2 shown in FIG. 3B.

Incidentally, the step S23 may be configured to generate a different transformation matrix A by use of the equation (2) and store the generated transformation matrix A in the transformation matrix memory 13c so as to affine transform the elliptical shape into a perfect circular shape having a radius Ry and center coordinates (0, 0), as mentioned above. The step S23 may also be configured to generate a different transformation matrix A by use of the equation (3) and store the generated transformation matrix A in the transformation matrix memory 13c so as to affine transform the elliptical shape into a perfect circular shape having a radius R (arbitrary value) and center coordinates (0, 0), as mentioned above.

After generating the transformation matrix A and storing it in the transformation matrix memory 13c (S23), the CPU 11 affine transforms the gradation center coordinates (Gx, Gy) stored in the gradation parameter memory 13b using the transformation matrix A stored in the transformation matrix memory 13c (S24). This step S24 corresponds to the step S3 shown in FIG. 3B.

Subsequently, the CPU 11 judges whether the gradation center coordinates obtained by the affine transformation of S24 are on the nonnegative part of the Y-axis or not (S25). When the gradation center coordinates after the affine transformation are on the nonnegative part of the Y-axis (S25: YES), the CPU 11 keeps the transformation matrix A stored in the transformation matrix memory 13c in order to use the transformation matrix A directly as the transformation matrix B (S26). Thereafter, the process advances to step S28.

On the other hand, when the gradation center coordinates after the affine transformation are not on the nonnegative part of the Y-axis (S25: NO), the CPU 11 calculates the angle θ between the positive Y-axis and the line segment connecting the origin (0, 0) and the gradation center after the affine transformation (see FIG. 3B) (step S4 shown in FIG. 3B), generates the transformation matrix B by adding the rotational operation around the origin (0, 0) by the angle θ (i.e. the aforementioned rotational element) to the transformation matrix A stored in the transformation matrix memory 13c by use of the equations (4) and (5) (step S5 shown in FIG. 3C), and stores the generated transformation matrix B in the transformation matrix memory 13c by overwriting the transformation matrix A (S27). Thereafter, the process advances to the step S28.

By executing the steps S25-S27 as above, the transformation matrix B, for affine transforming the elliptical shape specified by the RadialGradientBrush element (see FIG. 3A) into the perfect circular shape having the radius Rx and center coordinates (0, 0) and placing the gradation center on the nonnegative part of the Y-axis (see FIG. 3C), can be generated.

In the step S28, the CPU 11 affine transforms the gradation center coordinates (Gx, Gy) stored in the gradation parameter memory 13b by using the transformation matrix B this time, and stores the affine transformed gradation center coordinates in the gradation parameter memory 13b, by which the center of the gradation is placed on the nonnegative part of the Y-axis.

In this step S28, the radius Rx and the center coordinates (0, 0) of the perfect circular shape obtained by the affine transformation of the elliptical shape using the transformation matrix B are also stored in the gradation parameter memory 13b. These parameters are referred to when the perfect circular radial gradation is generated in the perfect circular radial gradation rasterization process which will be explained later.

Subsequently, the CPU 11 executes the perfect circular radial gradation rasterization process (FIG. 8) which will be explained later (S29), by which a radial gradation can be drawn for (in) the perfect circular shape shown in FIG. 3C (having the radius Rx and center coordinates (0, 0)) while reducing the load related to the drawing of the gradation. The perfect circular radial gradation is stored in the RAM 13 in the bitmap format (rasterization). This step S29 corresponds to the step S6 shown in FIG. 3C.

In the next step S30, the CPU 11 calculates an inverse matrix C of the transformation matrix B which has been kept or stored in the transformation matrix memory 13c in S26 or S27. By use of the inverse matrix C, the CPU 11 inversely affine transforms the perfect circular radial gradation stored in the RAM 13 in S29, stores the result of the inverse affine transformation in the page memory 13h in the bitmap format (S31), and ends the elliptical radial gradation rasterization process of FIG. 7.

By the step S31, the elliptical radial gradation specified by the RadialGradientBrush element can be generated as shown in FIG. 3E and rasterized on the page memory 13h. This step S31 corresponds to the step S7 shown in FIG. 3E.

As above, in the elliptical radial gradation rasterization process executed by the printer control unit 10 (CPU 11), the gradation is first drawn in a perfect circular shape (without directly drawing the specified gradation in the elliptical shape), by which each boundary line between annular areas to be drawn with different color values can be calculated based on the locus of a perfect circle. Since the calculation for the drawing of the gradation can be simplified compared to the case where the gradation is drawn directly for the elliptical shape, the load related to the drawing of the gradation can be reduced considerably.

Further, since the inverse matrix C of the transformation matrix B (generated based on the elliptical shape parameters to transform the elliptical shape into the perfect circular shape) is calculated and the perfect circular shape in which the gradation has been drawn is inversely affine transformed using the inverse matrix C, the radial gradation according to the elliptical shape and the gradation pattern specified by the RadialGradientBrush element can be generated with ease.

Thus, in cases where there exists a RadialGradientBrush element in a document described according to XPS, an elliptical radial gradation specified by the RadialGradientBrush element can be generated while reducing the load related to the drawing of the gradation.

Furthermore, since the center of the gradation after the affine transformation is placed on the Y-axis, the center positions (center coordinates) of the perfect circular shapes (in each of which a uniform color value is used for the drawing) are calculated along the Y-axis and the gradation is drawn for the perfect circles. With this method, the center positions of the perfect circles (perfect circular shapes in each of which a uniform color value is used for the drawing) can be calculated by using a one-dimensional function represented by the Y coordinate of the center position. Therefore, the number of calculations necessary for the drawing of the gradation in the perfect circular shape can be reduced further, and consequently, the load related to the drawing of the radial gradation can be reduced further.

Figure 8:
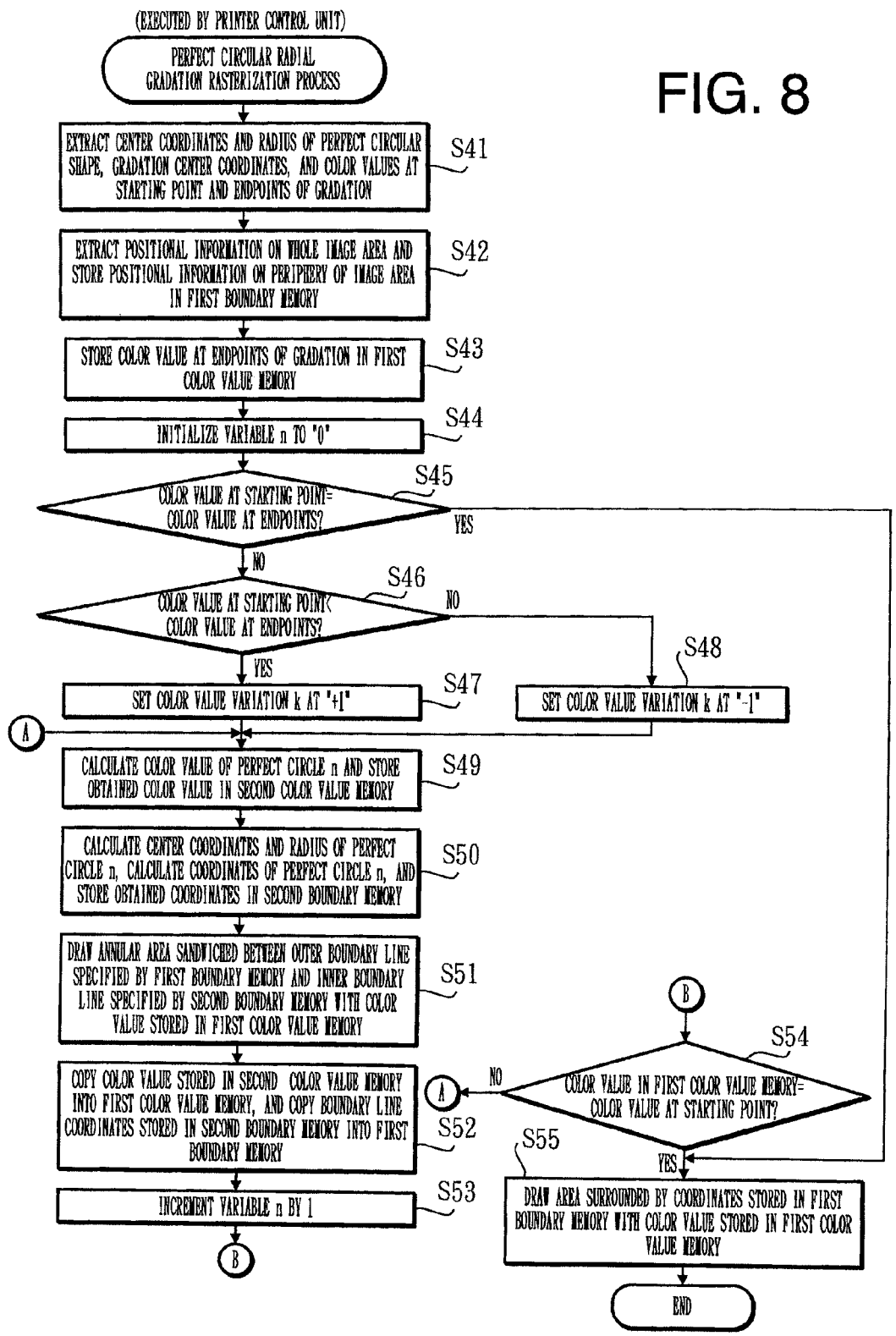
FIG. 8 is a flow chart of the perfect circular radial gradation rasterization process which is executed by the printer control unit.

Next, the perfect circular radial gradation rasterization process, which is executed by the printer control unit 10 (CPU 11) as the step S29 in FIG. 7, will be explained referring to FIG. 8. FIG. 8 is a flow chart of the perfect circular radial gradation rasterization process. This process is executed by the printer control unit 10 (CPU 11) for generating the perfect circular radial gradation (i.e. for drawing a radial gradation for (in) the perfect circular shape obtained by the affine transformation of the elliptical shape) in the elliptical radial gradation rasterization process. While this process is executed for each color (red, green, blue) independently as mentioned above, only the process for red will be described below. Since the processes for green and blue are executed in a flow equivalent to that for red, illustration and explanation thereof are omitted for brevity.

At the start of the perfect circular radial gradation rasterization process, the CPU 11 (printer control unit 10) reads out and extracts information about the center coordinates and the radius of the perfect circular shape obtained by the affine transformation, the gradation center coordinates in the perfect circular shape (i.e. the gradation center coordinates after the affine transformation) and the color values at the starting point (center) of the gradation and at the endpoints of the gradation (periphery of the perfect circular shape) from the gradation parameter memory 13*b* (S41).

The center coordinates and the radius of the perfect circular shape extracted from the gradation parameter memory 13*b* are (0, 0) and Rx since the affine transformation from the elliptical shape into the perfect circular shape has been executed in the elliptical radial gradation rasterization process (FIG. 7) so as to set the center coordinates and the radius at (0, 0) and Rx.

The color value at the starting point (center) of the gradation and the color value at the endpoints of the gradation (periphery of the perfect circular shape) in the perfect circular radial gradation are set equal to the color value Rs at the starting point (center) of the elliptical radial gradation and the color value Re at the endpoints of the elliptical radial gradation (periphery of the elliptical shape), respectively (see FIGS. 2A and 2B). Thus, the color values at the starting point and endpoints of the perfect circular radial gradation are extracted by just reading out the color values Rs and Re (at the starting point and endpoints of the elliptical radial gradation) from the gradation parameter memory 13*b*.

Subsequently, the CPU 11 extracts positional information on the whole image area (in which the gradation pattern in the perfect circular shape is drawn) and stores positional information on the periphery of the image area in the first boundary memory 13*f* as positional information on the outer boundary line of the outermost annular area (annular area #0) to be drawn in one color with a uniform color value (S42), while storing the color value Re at the endpoints of the gradation (periphery of the perfect circular shape) in the first color value memory 13*d* as the color value for the annular area #0 (S43).

Incidentally, the positional information on the whole image area is extracted by affine transforming an area (in which the elliptical radial gradation specified by the RadialGradientBrush element is drawn) specified in the XPS document in cases where the area is specified in the XPS document. When the area (in which the elliptical radial gradation is drawn) is not specified in the XPS document, the positional information on the whole image area is extracted by affine transforming the whole printing area.

Subsequently, the CPU 11 reserves a memory area for storing a variable n in the RAM 13 and sets the variable n at an initial value "0" (S44). The variable n is used for specifying each perfect circle (0, 1, n, . . . ) shown in FIG. 4 serving as a boundary between annular areas (each of which is drawn in one color with a uniform color value) in the perfect circular shape.

Subsequently, the CPU 11 judges whether or not the color value Rs at the starting point (center) of the perfect circular radial gradation is equal to the color value Re at the endpoints of the perfect circular radial gradation (periphery of the perfect circular shape) (S45).

When the color values Rs and Re are unequal (S45: NO), the CPU 11 judges whether the color value Rs at the starting point of the gradation is smaller than the color value Re at the endpoints of the gradation (S46).

When the color value Rs is smaller than the color value Re (S46: YES), the CPU 11 sets the color value variation k (the difference in the color value between two adjacent annular areas) at "+1" (S47) and thereafter advances to step S49.

On the other hand, when the color value Rs at the starting point of the gradation is larger than the color value Re at the endpoints of the gradation (S46: NO), the CPU 11 sets the color value variation k at "−1" (S48) and thereafter advances to the step S49. By the steps S46-S48, the color value variation k (the difference in the color value between two adjacent annular areas) is set properly depending on the relationship between the color values Rs and Re at the starting point and endpoints of the gradation.

In the step S49, the CPU 11 calculates the color value of the perfect circle n (specified by the variable n) using the equation (13) and stores the obtained color value in the second color value memory 13*e* as the color value of an annular area having the perfect circle n as its outer boundary (S49).

Subsequently, the CPU 11 calculates the center coordinates and the radius of the perfect circle n using the equations (10)-(12), calculates the coordinates of the perfect circle n based on the obtained center coordinates and radius, and stores the obtained coordinates in the second boundary memory 13*g* as the coordinates of the inner boundary line of the annular area (S50).

The CPU 11 determines an area sandwiched between the outer boundary line coordinates stored in the first boundary memory 13*f* in the aforementioned step S42 or step S52 (explained later) and the inner boundary line coordinates stored in the second boundary memory 13*g* in the step S50 as the annular area, and then draws the determined annular area in one color with the color value stored in the first color value memory 13*d* (S51). Incidentally, the drawing process is executed by storing the color value (stored in the first color value memory 13*d*) for each pixel included in a corresponding annular area in an image area drawing area (for the drawing of the image area) reserved in the RAM 13.

Thereafter, the CPU 11 copies the color value stored in the second color value memory 13*e* into the first color value memory 13*d*, while also copying the boundary line coordinates stored in the second boundary memory 13*g* into the first boundary memory 13*f* (S52).

By the step S52, the color value (of the annular area having the perfect circle n as its outer boundary) calculated in S49 is stored in the first color value memory 13*d*, and the coordinates of the perfect circle n are stored in the first boundary memory 13*f* as the outer boundary line coordinates of the annular area to be drawn next. Therefore, when the step S51 is executed for the annular area (to be drawn next), the outer boundary line coordinates of the annular area are specified by the first boundary memory 13*f*, and the color value to be used for the drawing of the annular area is specified by the first color value memory 13*d*.

Since the coordinates of the perfect circle n (which have been calculated as the inner boundary line coordinates of the currently processed annular area) can be specified as the outer boundary line coordinates of the immediately inner annular area (adjoining the former annular area) as above, the load related to the determination of the annular areas can be kept light.

After finishing S52, the CPU 11 increments the variable n by 1 (S53), by which the perfect circle as the processing target of the steps S49 and S50 (calculation of the color value, center coordinates and radius) is changed to the next (immediately inner) perfect circle.

Subsequently, the CPU 11 judges whether or not the color value stored in the first color value memory 13*d* is equal to the color value Rs at the starting point (center) of the gradation (S54). If negative (S54: NO), the CPU 11 returns to S49 and executes the steps S49-S54 again.

By the next execution of S49-S54, the drawing process is conducted for the next (immediately inner) annular area. The steps S49-S54 are executed repeatedly until the color value stored in the first color value memory 13*d* is judged in S54 to be equal to the color value Rs at the starting point (center) of the gradation (S54: YES). By the repetition, annular areas are determined successively from the periphery of the perfect circular shape toward the center of the gradation while executing the drawing process for each of the annular areas.

When the color value stored in the first color value memory 13*d* is judged to be equal to the color value Rs at the starting point (center) of the gradation in S54 (S54: YES), the CPU 11 exits from the loop of S49-S54 and advances to step S55.

In the step S55, the CPU 11 draws the whole of an area surrounded by the coordinates stored in the first boundary memory 13*f* with the color value stored in the first color value memory 13*d* and ends the perfect circular radial gradation rasterization process of FIG. 8. Specifically, in the image area drawing area reserved in the RAM 13, the color value stored in the first color value memory 13*d* is stored for each pixel included in a corresponding area.

By the step S55, the perfect circular area formed at the center of the perfect circular radial gradation is drawn with the color value Rs at starting point (center) of the gradation, by which the rasterization of the perfect circular radial gradation on the RAM 13 is completed.

Also when the color value Rs at the starting point of the perfect circular radial gradation is judged to be equal to the color value Re at the endpoints of the perfect circular radial gradation in S45 (S45: YES), the CPU 11 advances to the step S55, draws the whole of an area surrounded by the coordinates stored in the first boundary memory 13*f* with the color value stored in the first color value memory 13*d*, and ends the perfect circular radial gradation rasterization process of FIG. 8. In this case, a single-color image, in which the whole image area is drawn with one color with the color value Rs at the starting point of the gradation (i.e. the color value Re at the endpoints of the gradation), is generated.

As above, by the perfect circular radial gradation rasterization process, each annular area having a prescribed width (to be drawn in one color with a uniform color value) is determined, and each determined annular area is drawn in one color with the uniform color value. Therefore, the drawing in one color with a color value corresponding to a previously determined annular area can be restricted to the previously determined annular area.

In other words, in the perfect circular radial gradation to be generated finally, each area that should be drawn with a color value different from a particular color value is consistently prevented from being drawn with the particular color value throughout the process for generating the radial gradation, by which the load related to the drawing process can be reduced to a minimum.

Further, since the annular areas (each of which should be drawn in one color with a uniform color value) are set successively from the periphery of the image area (in which the radial gradation is drawn) toward the center of the gradation, the annular areas can be determined successively from the periphery of the radial gradation toward the center of the radial gradation in the whole drawing area of the radial gradation. Therefore, the perfect circular radial gradation can be generated while reducing the load related to the drawing of the gradation.

As described above, by the printer control unit 10 of the printer 1 in accordance with the first embodiment of the present invention, a radial gradation can be generated while reducing the load related to the drawing of the gradation, by determining each annular area to be drawn in one color with a uniform color value and drawing each determined annular area in one color with the uniform color value in the drawing of the radial gradation.

Further, with the printer 1 in accordance with the first embodiment, when data received from the PC 100 following a print command includes an instruction for drawing a radial gradation, the radial gradation is generated by the above printer control unit 10. Therefore, the printing of a radial gradation can be carried out by generating the radial gradation while reducing the load related to the drawing of the gradation.

Embodiment 2

In the following, a printer 1 (including a printer control unit 10) in accordance with a second embodiment of the present invention will be described referring to FIGS. 9A-9E and FIG. 10. In the first embodiment, the printer control unit 10 generated a perfect circular radial gradation by determining each annular area (to be drawn in one color with a uniform color value) and drawing each determined annular area in one color with the uniform color value successively from the periphery of the image area (in which the radial gradation is drawn) toward the center of the gradation.

In contract, the printer control unit 10 in the second embodiment generates a perfect circular radial gradation by determining each annular area (to be drawn in one color with a uniform color value) and drawing each determined annular area in one color with the uniform color value successively from the center of the gradation toward the periphery of the image area in which the radial gradation is drawn.

In the following explanation of the second embodiment, only the difference from the first embodiment will be described, wherein reference characters identical with those used in the first embodiment represent elements identical with those in the first embodiment, and thus repeated explanation thereof will be omitted.

Figure 10:
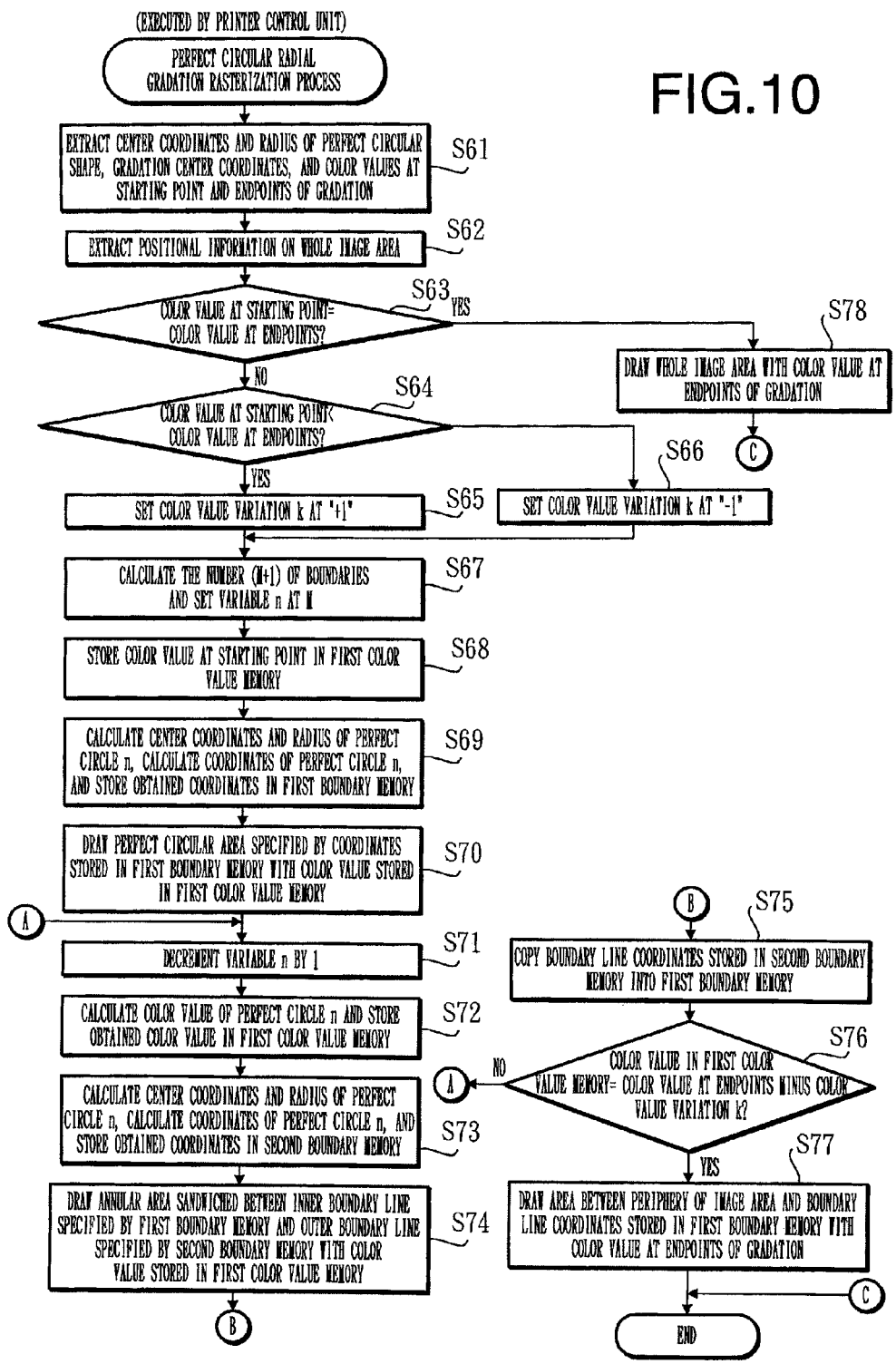
FIG. 10 is a flow chart of the perfect circular radial gradation rasterization process which is executed by a printer control unit in the second embodiment.

The electrical configuration of the printer 1 of the second embodiment (including a printer control unit 10 in accordance with the second embodiment) differs from that of the printer 1 of the first embodiment (including the printer control unit 10 of the first embodiment) shown in FIG. 1 in the following points:

In the printer control unit 10 in the second embodiment, as the program for the perfect circular radial gradation rasterization process (included in the control program 12a stored in the ROM 12), a program for executing a flow chart of FIG. 10 is stored instead of the program for executing the flow chart of FIG. 8. Meanwhile, as the programs for the printing process and the elliptical radial gradation rasterization process, programs identical with those in the first embodiment (see FIGS. 6 and 7) are stored.

By running the program for the perfect circular radial gradation rasterization process shown in the flow chart of FIG. 10, the CPU 11 of the printer control unit 10 in the second embodiment determines each annular area (to be drawn in one color with a uniform color value) and draws each determined annular area in one color with a corresponding color value successively from the center of the gradation toward the periphery of the perfect circular shape. The details of the principles for the drawing of the perfect circular radial gradation employed in the second embodiment will be explained later with reference to FIGS. 9A-9E.

In the printer control unit 10 in the second embodiment, the first color value memory 13d formed in the RAM 13 is used when the annular areas are determined successively from the center of the gradation toward the periphery of the perfect circular shape, as memory for storing the color value of an annular area as the target of the determination.

By executing the perfect circular radial gradation rasterization process (FIG. 10), the CPU 11 calculates the color value for the drawing of the annular area as the target of the determination and stores the calculated color value in the first color value memory 13d. When the annular area has been determined, the CPU 11 reads out the color value stored in the first color value memory 13d and draws the determined annular area in one color with the color value. Incidentally, the second color value memory 13e employed in the first embodiment may be left out of the RAM 13 in the second embodiment since the second color value memory 13e is not used by the printer control unit 10 in the second embodiment.

In the printer control unit 10 in the second embodiment, the first boundary memory 13f and the second boundary memory 13g formed in the RAM 13 are used when the annular areas are determined successively from the center of the gradation toward the periphery of the perfect circular shape, as memories for storing coordinates specifying the inner boundary line and the outer boundary line of the annular area as the target of the determination, respectively.

By executing the perfect circular radial gradation rasterization process, the CPU 11 calculates the coordinates of the outer boundary line of the annular area as the determination target and stores the calculated outer boundary line coordinates in the second boundary memory 13g.

Meanwhile, the first boundary memory 13f is used for storing coordinates of the outer boundary line of an immediately inner annular area adjoining the annular area as the determination target, that is, coordinates of the inner boundary line of the annular area as the determination target. Thus, the CPU 11 specifies an area sandwiched between the inner boundary line coordinates stored in the first boundary memory 13f and the outer boundary line coordinates stored in the second boundary memory 13g as the annular area as the determination target.

After drawing the specified (determined) annular area in one color with the color value read out from the first color value memory 13d, the CPU 11 copies the outer boundary line coordinates stored in the second boundary memory 13g into the first boundary memory 13f, which allows the CPU 11 to thereafter refer to the boundary line coordinates stored in the first boundary memory 13f as the inner boundary line coordinates of an immediately outer annular area (as the next determination target).

The above are the differences from the first embodiment in the electrical configuration of the printer control unit 10. The other features are identical with those in the first embodiment, and thus repeated illustration and explanation thereof are omitted for brevity.

Next, the flow of the perfect circular radial gradation rasterization process (S6 in FIG. 3C) in the second embodiment will be explained referring to FIGS. 9A-9E. FIGS. 9A-9E are schematic diagram for explaining the flow of the perfect circular radial gradation rasterization process in the second embodiment.

While such a radial gradation rasterization process is executed independently for each color (red, green, blue), only a perfect circular radial gradation rasterization process for red will be explained here referring to FIGS. 9A-9E. The radial gradation rasterization processes for green and blue are identical with the radial gradation rasterization process for red (explained here), and thus illustration and explanation thereof are omitted for brevity.

In the perfect circular radial gradation rasterization process of the second embodiment, the perfect circular radial gradation is rasterized on the RAM 13 by determining each annular area (to be drawn in one color with a uniform color value) and drawing each determined annular area in one color with a corresponding color value (red/green/blue color values) successively from the center of the gradation toward the periphery of the perfect circular shape.

Specifically, the CPU 11 (printer control unit 10) previously calculates the number (M) of annular areas to be formed in the drawing of the radial gradation and thereby obtains the number (M+1) of boundaries of the annular areas. The number (M) of annular areas can be calculated by dividing the color value difference between the starting point and the endpoints of the gradation by the color value variation k.

Figure 9A:
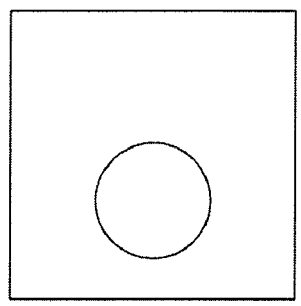
FIGS. 9A-9E are schematic diagrams for explaining the flow of a perfect circular radial gradation rasterization process in a second embodiment of the present invention.

Subsequently, the CPU 11 determines the center coordinates and the radius of a perfect circle M (n=M) using the equations (10)-(12), calculates the coordinates of the perfect circle M based on the obtained center coordinates and radius, specifies the perfect circle M as the (outer) boundary of a perfect circular area to be drawn with the color value Rs at the center (starting point) of the gradation, and stores the obtained coordinates of the perfect circle M in the first boundary memory 13f (FIG. 9A). Incidentally, the coordinates stored in the first boundary memory 13f also represent the inner boundary line coordinates of an immediately outer annular area (hereinafter referred to as an "annular area #M") adjoining the perfect circular area.

Figure 9B:
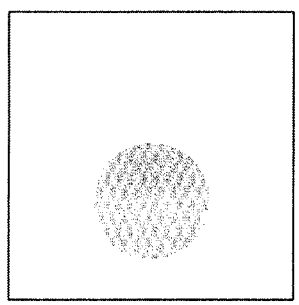

Subsequently, the CPU 11 stores the color value Rs at the center (starting point) of the gradation in the first color value memory 13d, and draws the perfect circular area (specified by the coordinates stored in the first boundary memory 13f) in one color with the color value stored in the first color value memory 13d, that is, the color value Rs at the center (starting point) of the gradation (FIG. 9B).

Figure 9C:
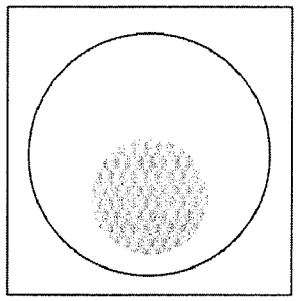

Subsequently, the CPU 11 determines the center coordinates and the radius of a perfect circle (M−1) (n=M−1), which serves as the outer boundary of the annular area #M and the inner boundary of an immediately outer annular area #(M−1) adjoining the annular area #M, using the equations (10)-(12), calculates the coordinates of the perfect circle (M−1) based on the obtained center coordinates and radius, and stores the obtained coordinates of the perfect circle (M−1) in the second boundary memory 13g (FIG. 9C).

Subsequently, the CPU 11 determines the color value of the annular area #M (whose outer boundary is specified by the perfect circle (M−1)) using the equation (13) and stores the obtained color value in the first color value memory 13d. Subsequently, the CPU 11 determines an area sandwiched between the inner boundary line coordinates (of the annular area #M) stored in the first boundary memory 13f and the outer boundary line coordinates (of the annular area #M) stored in the second boundary memory 13g as the annular area #M, and then draws the annular area #M in one color with the color value stored in the first color value memory 13d (FIG. 9D).

After drawing the annular area #M, the CPU 11 copies the coordinates of the perfect circle (M−1) (stored in the second boundary memory 13g) into the first boundary memory 13f, by which the inner boundary line coordinates of the annular area #(M−1) are stored in the first boundary memory 13f. Thereafter, the CPU 11 repeats the steps shown in FIGS. 9C and 9D for subsequent annular areas toward the periphery of the perfect circular shape.

Figure 9D:
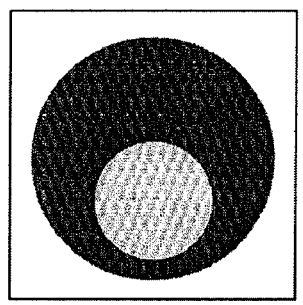
Figure 9E:
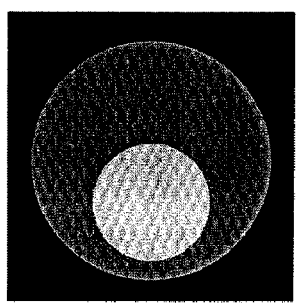

At the point when the step of FIG. 9D is finished for an annular area, if the color value of the annular area drawn in the step of FIG. 9D (i.e. the color value stored in the first color value memory 13d) has become equal to a color value obtained by subtracting the color value variation k from the color value Re at the periphery of the perfect circular shape (endpoints of the gradation), the process exits from the loop (FIGS. 9C and 9D) and advances to the step shown in FIG. 9E.

In the step of FIG. 9E, the CPU 11 draws the remaining area (between the boundary line coordinates copied into the first boundary memory 13f from the second boundary memory 13g and the periphery of the image area) in one color with the color value Re at the periphery of the perfect circular shape (endpoints of the gradation).

As above, in the perfect circular radial gradation rasterization process in the second embodiment, each annular area (to be drawn in one color with a uniform color value) can be determined and drawn in one color with a corresponding color value successively from the center of the gradation toward the periphery of the perfect circular shape, by which the perfect circular radial gradation can be rasterized on the RAM 13.

Next, the perfect circular radial gradation rasterization process, which is executed by the printer control unit 10 (CPU 11) in the second embodiment as the step S29 in FIG. 7, will be explained referring to FIG. 10. FIG. 10 is a flow chart of the perfect circular radial gradation rasterization process in the second embodiment.

Similarly to the perfect circular radial gradation rasterization process executed by the printer control unit 10 (CPU 11) in the first embodiment, the process of FIG. 10 is executed by the CPU 11 (printer control unit 10) for generating the perfect circular radial gradation (i.e. for drawing a radial gradation for (in) the perfect circular shape obtained by the affine transformation of the elliptical shape) in the elliptical radial gradation rasterization process.

While this process is executed for each color (red, green, blue) independently as mentioned above, only the process for red will be described below. Since the processes for green and blue are executed in a flow equivalent to that for red, illustration and explanation thereof are omitted for brevity.

At the start of the perfect circular radial gradation rasterization process, the CPU 11 (printer control unit 10) reads out and extracts information about the center coordinates and the radius of the perfect circular shape obtained by the affine transformation, the gradation center coordinates in the perfect circular shape (i.e. the gradation center coordinates after the affine transformation) and the color values at the starting point (center) of the gradation and at the endpoints of the gradation (periphery of the perfect circular shape) from the gradation parameter memory 13b (S61), similarly to the step S41 in the perfect circular radial gradation rasterization process in the first embodiment.

Subsequently, the CPU 11 extracts positional information on the whole image area (in which the gradation pattern in the perfect circular shape is drawn) and stores the positional information in the RAM 13 (S62).

Subsequently, the CPU 11 judges whether or not the color value Rs at the starting point (center) of the perfect circular radial gradation is equal to the color value Re at the endpoints of the perfect circular radial gradation (periphery of the perfect circular shape) (S63).

When the color values Rs and Re are unequal (S63: NO), the CPU 11 judges whether the color value Rs at the starting point of the gradation is smaller than the color value Re at the endpoints of the gradation (S64).

When the color value Rs is smaller than the color value Re (S64: YES), the CPU 11 sets the color value variation k (the difference in the color value between two adjacent annular areas) at "+1" (S65) and thereafter advances to step S67.

On the other hand, when the color value Rs at the starting point of the gradation is larger than the color value Re at the endpoints of the gradation (S64: NO), the CPU 11 sets the color value variation k at "−1" (S66) and thereafter advances to the step S67. By the steps S64-S66, the color value variation k (the difference in the color value between two adjacent annular areas) is set properly depending on the relationship between the color values Rs and Re at the starting point and endpoints of the gradation.

Subsequently, the CPU 11 calculates the number of annular areas (each of which should be drawn in one color with a uniform color value) to be formed in the drawing of the radial gradation, thereby obtains the number (M+1) of boundaries of the annular areas, and sets the variable n at M (the number of boundaries minus 1) (S67).

The variable n set in this step is used for specifying each perfect circle (0, 1, . . . , n, . . . ) shown in FIG. 4 serving as a boundary between annular areas (each of which is drawn in one color with a uniform color value) in the perfect circular shape. As mentioned above, the number of annular areas can be calculated by dividing the color value difference between the starting point and the endpoints of the gradation by the color value variation k.

Subsequently, the CPU 11 stores the color value Rs at the starting point (center) of the gradation in the first color value memory 13d (S68), calculates the center coordinates and the radius of the perfect circle n (perfect circle M) using the equations (10)-(12), calculates the coordinates of the perfect circle M based on the obtained center coordinates and radius, and stores the obtained coordinates in the first boundary memory 13f as the coordinates of the boundary line of the perfect circular area to be drawn with the color value Rs at the starting point of the gradation (S69). The coordinates stored in the first boundary memory 13f will also be used later as the inner boundary line coordinates of the immediately outer annular area adjoining the perfect circular area.

Subsequently, the CPU 11 draws the perfect circular area (specified by the coordinates stored in the first boundary memory 13*f*) in one color with the color value stored in the first color value memory 13*d* (S70). Incidentally, the drawing process is executed by storing the color value Rs for each pixel included in the perfect circular area in the image area drawing area (for the drawing of the image area) reserved in the RAM 13.

By the step S70, the perfect circular area formed at the center of the perfect circular radial gradation can be drawn in one color with the color value Rs at the starting point (center) of the gradation.

After drawing the perfect circular area, the CPU 11 decrements the variable n by 1 (S71). This decrement means shifting of the perfect circle (which is used in the following steps for calculating the color value and the outer boundary line coordinates of an annular area) to an immediately outer perfect circle, by which a currently processed annular area (as the target of the calculation of the color value and the outer boundary line coordinates) is changed to the next (immediately outer) annular area.

Subsequently, the CPU 11 calculates the color value of the perfect circle n (specified by the variable n) using the equation (13) and stores the obtained color value in the first color value memory 13*d* as the color value of an annular area having the perfect circle n as its outer boundary (S72).

The CPU 11 also calculates the center coordinates and the radius of the perfect circle n using the equations (10)-(12), thereby calculates the coordinates of the perfect circle n, and stores the obtained coordinates in the second boundary memory 13*g* as the outer boundary line coordinates of the annular area (S73).

Subsequently, the CPU 11 determines an area sandwiched between the inner boundary line coordinates stored in the first boundary memory 13*f* in the aforementioned step S69 or step S75 (explained later) and the outer boundary line coordinates stored in the second boundary memory 13*g* in the step S73 as the annular area, and then draws the determined annular area in one color with the color value stored in the first color value memory 13*d* (S74).

Incidentally, the drawing process is executed by storing the color value (stored in the first color value memory 13*d*) for each pixel included in a corresponding annular area in the image area drawing area reserved in the RAM 13.

Thereafter, the CPU 11 copies the boundary line coordinates stored in the second boundary memory 13*g* into the first boundary memory 13*f* (S75), by which the coordinates of the perfect circle n are stored in the first boundary memory 13*f* as the inner boundary line coordinates of an immediately outer annular area to be drawn next. Therefore, when the step S74 is executed for the annular area (to be drawn next), the inner boundary line coordinates of the annular area are specified by the first boundary memory 13*f*.

Since the coordinates of the perfect circle n (which have been calculated as the outer boundary line coordinates of the currently processed annular area) can be specified as the inner boundary line coordinates of the immediately outer annular area (adjoining the former annular area) as above, the load related to the determination of the annular areas can be kept light.

After finishing S75, the CPU 11 judges whether or not the color value stored in the first color value memory 13*d* is equal to the color value obtained by subtracting the color value variation k from the color value Re at the endpoints of the gradation (periphery of the perfect circular shape) (S76). If negative (S76: NO), the CPU 11 returns to S71 and executes the steps S71-S76 again.

By the next execution of S71-S76, the drawing process is conducted for the next (immediately outer) annular area. The steps S71-S76 are executed repeatedly until the color value stored in the first color value memory 13*d* is judged in S76 to be equal to the color value obtained by subtracting the color value variation k from the color value Re at the endpoints of the gradation (periphery of the perfect circular shape) (S76: YES). By the repetition, annular areas are determined successively from the center of the gradation toward the periphery of the perfect circular shape while executing the drawing process for each of the annular areas.

When the color value stored in the first color value memory 13*d* is judged to be equal to the color value obtained by subtracting the color value variation k from the color value Re at the endpoints of the gradation in S76 (S76: YES), the CPU 11 exits from the loop of S71-S76 and advances to step S77.

In the step S77, the CPU 11 reads out the positional information on the whole image area (which has been extracted in S62) from the RAM 13, draws an area between the periphery of the image area and the boundary line coordinates stored in the first boundary memory 13*f* with the color value Re at the endpoints of the gradation (periphery of the perfect circular shape), and ends the perfect circular radial gradation rasterization process of FIG. 10. Specifically, in the image area drawing area reserved in the RAM 13, the color value Re is stored for each pixel included in a corresponding area, by which the rasterization of the perfect circular radial gradation on the RAM 13 is completed.

When the color value Rs at the starting point of the perfect circular radial gradation is judged to be equal to the color value Re at the endpoints of the perfect circular radial gradation in S63 (S63: YES), the CPU 11 draws the whole image area with the color value Re at the endpoints of the gradation (periphery of the perfect circular shape), and ends the perfect circular radial gradation rasterization process of FIG. 10. In this case, a single-color image, in which the whole image area is drawn with one color with the color value Re, is generated.

As above, by the perfect circular radial gradation rasterization process in the second embodiment, each annular area having a prescribed width (to be drawn in one color with a uniform color value) is determined, and each determined annular area is drawn in one color with the uniform color value. Therefore, similarly to the first embodiment, the drawing in one color with a color value specified for a previously determined annular area (drawn in one color with the color value) can be restricted to the previously determined annular area, by which the load related to the drawing process can be reduced to a minimum.

Further, since the annular areas (each of which should be drawn in one color with a uniform color value) are set successively from the center of the radial gradation toward the periphery of the image area in which the gradation is drawn, the annular areas can be determined successively from the center of the radial gradation toward the periphery of the radial gradation in the whole drawing area of the radial gradation. Therefore, the perfect circular radial gradation can be generated while reducing the load related to the drawing of the gradation.

As described above, by the printer control unit 10 of the printer 1 in accordance with the second embodiment of the present invention, a radial gradation can be generated while reducing the load related to the drawing of the gradation, by determining each annular area to be drawn in one color with a uniform color value and drawing each determined annular area in one color with the uniform color value in the drawing of the radial gradation.

Further, with the printer 1 in accordance with the second embodiment, when data received from the PC 100 following a print command includes an instruction for drawing a radial gradation, the radial gradation is generated by the above printer control unit 10. Therefore, the printing of a radial gradation can be carried out by generating the radial gradation while reducing the load related to the drawing of the gradation.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

For example, while the major axis and minor axis of the elliptical shape specified by the RadialGradientBrush element (image drawing instruction) of the XPS document are set in the X-axis direction and Y-axis direction in the above embodiments, the major axis and minor axis of the elliptical shape may be set in arbitrary directions.

In this case, it is possible to first execute rotational affine transformation to the elliptical shape specified by the image drawing instruction so as to set its major axis and minor axis in the X-axis direction and Y-axis direction, generate the elliptical radial gradation according to the drawing principles explained referring to FIGS. 3A-3E, and finally execute inverse rotational affine transformation to the obtained elliptical radial gradation to return the major axis and minor axis of the (rotated) elliptical shape to the original directions specified by the image drawing instruction.

While the color values at the center (starting point) of the gradation and the color values at the periphery of the elliptical shape (endpoints of the gradation) are specified by the RadialGradientBrush.GradientStops element included in the RadialGradientBrush element in the above embodiments, the above embodiments are applicable also to cases where the RadialGradientBrush.GradientStops element further includes a GradientStop element which specifies color values at an arbitrary point between the starting point and endpoint of the gradation.

In this case, a value represented by an "Offset" attribute of the GradientStop element specifying the color values at the arbitrary point indicates a (relative) distance d between the starting point of the gradation and the arbitrary point for which the color values are specified by the GradientStop element (when the distance between the starting point and an endpoint of the gradation situated on a line extending from the starting point and crossing the arbitrary point is normalized to "1"). Therefore, the drawing of the gradation for (in) the perfect circular shape can be executed by setting color values of corresponding points (that are the (relative) distance d away from the center (starting point) of the perfect circular gradation) at the color values of the arbitrary point specified by the GradientStop element.

While the inverse matrix C of the transformation matrix B is calculated after generating the radial gradation for the perfect circular shape in the elliptical radial gradation rasterization process (FIG. 7) in the above embodiments, the timing of the inverse matrix calculation is not restricted to that in the above embodiments; the inverse matrix C may be calculated at any time after the generation of the transformation matrix B and before the inverse affine transformation of the perfect circular shape in which the radial gradation has been drawn.

While the elliptical radial gradation rasterization process (FIG. 7) is executed when (on condition that) data received from the PC 100 following a print command is an XPS document and a RadialGradientBrush element (as an instruction for drawing an elliptical radial gradation) is included in the XPS document in the above embodiments, the condition for executing the elliptical radial gradation rasterization process is not restricted to that in the embodiments. The elliptical radial gradation rasterization process may be executed at any time when an instruction for drawing an elliptical radial gradation is included in PDL data (data described in a PDL (Page Description Language)) received from the PC 100 following a print command.

While the printer control unit 10 is provided inside the printer 1 in the above embodiments, the printer control unit 10 may be provided outside the printer 1 and connected to the printer 1 via a communication cable or wireless communication. The printer control unit 10 may also be provided inside the PC 100.

While the elliptical radial gradation rasterization process (FIG. 7) and the perfect circular radial gradation rasterization process (FIG. 8, FIG. 10) are executed by the printer control unit 10 to generate an elliptical radial gradation to be printed by the printer 1 in the above embodiments, the elliptical radial gradation rasterization process and the perfect circular radial gradation rasterization process may be executed not only by such a printer control unit but also by any unit/device that controls a device for outputting an elliptical radial gradation.

For example, in cases where a display is used for displaying an elliptical radial gradation, a display control unit for controlling the display may execute the elliptical radial gradation rasterization process (FIG. 7) and the perfect circular radial gradation rasterization process (FIG. 8, FIG. 10) and rasterize the elliptical radial gradation generated by the processes on a frame memory for storing image data to be displayed on the display.

While the printer 1 in the above embodiments prints an image (e.g. elliptical radial gradation) on a sheet (e.g. paper) as a print medium, the printer 1 may also be configured to execute the printing on other types of print media (fabric, plastic, vinyl, etc.).

While the transformation matrix B is generated so as to place the center of the gradation after the affine transformation on the nonnegative part of the Y-axis in the above embodiments, the transformation matrix B may also be generated so as to place the gradation center (after the affine transformation) on the nonpositive part of the Y-axis. It is also possible to generate the transformation matrix B so as to place the gradation center (after the affine transformation) on the nonnegative part of the X-axis or on the nonpositive part of the X-axis.

In the above embodiments, when a RadialGradientBrush element as an instruction for drawing an elliptical radial gradation is included in an XPS document, the elliptical radial gradation specified by the instruction is generated by first generating a perfect circular radial gradation (by calculating the transformation matrix for affine transforming the elliptical shape specified by the instruction into a perfect circular shape, determining each annular area (to be drawn in one color with a uniform color value) for the perfect circular shape, and drawing each determined annular area in one color with the uniform color value) and then inversely affine transforming the perfect circular radial gradation using the inverse matrix of the transformation matrix. However, the elliptical radial gradation specified by the instruction may be generated in different methods. For example, the elliptical radial gradation may be generated directly for the elliptical shape, by determining each annular area (to be drawn in one color with a uniform color value) directly for the elliptical shape and drawing each determined annular area in one color with the uniform color value.

While examples of methods of generating an elliptical radial gradations have been described in the above embodiments, the embodiments are also applicable to cases where a radial gradation in a different shape is generated. For example, even when an instruction for drawing a radial gradation in which the color value changes radially from the center of the gradation through multiple areas in an arbitrarily specified shape (triangle, quadrangle, perfect circle, etc.) is included in the PDL data (data described in a PDL (Page Description Language)) received from the PC 100 following a print command, the radial gradation in the specified shape may be generated by determining each annular area (to be drawn in one color with a uniform color value) for the specified shape and drawing each determined annular area in one color with the uniform color value.

What is claimed is:

1. An image generating device for generating an image including a gradation, in which a color changes from a center of the gradation through annular areas, according to an image drawing instruction, comprising:
   an extraction unit configured to extract elliptical shape parameters specifying the elliptical shape including center coordinates of the elliptical shape and gradation pattern parameters specifying a gradation pattern to be drawn in the elliptical shape and including center coordinates of the gradation from the image drawing instruction, when the image drawing instruction includes an instruction for drawing a gradation in an elliptical shape, the center coordinates of the gradation is different from the center coordinates of the elliptical shape;
   a transformation matrix generating unit configured to generate a transformation matrix for transforming the elliptical shape into a perfect circular shape based on the elliptical shape parameters extracted by the extraction unit;
   a transformation unit configured to transform the gradation pattern parameters extracted by the extraction unit using the transformation matrix generated by the transformation matrix generating unit;
   an area determination unit configured to determine a plurality of annular areas based on the transformed gradation pattern parameters transformed by the transformation unit, each of the annular areas is specified by an inner boundary line and an outer boundary line surrounding the inner boundary line, the inner boundary line is specified by center coordinates and a radius of a first perfect circular shape calculated by the transformed gradation pattern parameters transformed by the transformation unit, the outer boundary line is specified by center coordinates and a radius of a second perfect circular shape calculated by the transformed gradation pattern parameters transformed by the transformation unit, and the center coordinates of the second perfect circular shape are different from the center coordinates of the first perfect circular shape;
   a drawing unit configured to draw a perfect circular radial gradation by drawing each of the annular areas determined by the area determination unit in one color with one color value;
   an inverse matrix generating unit configured to generate an inverse matrix of the transformation matrix generated by the transformation matrix generating unit; and
   an inverse-transformation unit configured to generate an elliptical radial gradation by transforming the perfect circular radial gradation drawn by the drawing unit using the inverse matrix generated by the inverse matrix generating unit.

2. The image generating device according to claim 1, wherein the area determination unit includes:
   an area setting unit that successively sets each of the annular areas, from a periphery of an area in which the gradation is drawn toward the center of the gradation;
   a first boundary line determination unit that determines an inner boundary line of a first annular area set by the area setting unit;
   a boundary line storage unit that stores parameters specifying the inner boundary line of the first annular area; and
   a second boundary line determination unit that determines the inner boundary line of the first annular area as an outer boundary line of a second annular area set by the area setting unit.

3. The image generating device according to claim 1, wherein the area determination unit includes:
   an area setting unit that successively sets each of the annular areas, from the center of the gradation toward a periphery of an area in which the gradation is drawn;
   a first boundary line determination unit that determines an outer boundary line of a first annular area set by the area setting unit;
   a boundary line storage unit that stores parameters specifying the outer boundary line of the first annular area; and
   a second boundary line determination unit that determines the outer boundary line of the first annular area as an inner boundary line of a second annular area set by the area setting unit.

4. A printing device comprising an image generating unit which generates an image including a gradation, in which a color changes from a center of the gradation through annular areas, according to an image drawing instruction and a printing unit that prints the image generated by the image generating unit on a print medium, wherein the image generating unit includes:
   an extraction unit configured to extract elliptical shape parameters specifying the elliptical shape including center coordinates of the elliptical shape and gradation pattern parameters specifying a gradation pattern to be drawn in the elliptical shape and including center coordinates of the gradation from the image drawing instruction, when the image drawing instruction includes an instruction for drawing a gradation in an elliptical shape, the center coordinates of the gradation is different from the center coordinates of the elliptical shape;
   a transformation matrix generating unit configured to generate a transformation matrix for transforming the elliptical shape into a perfect circular shape based on the elliptical shape parameters extracted by the extraction unit;
   a transformation unit configured to transform the gradation pattern parameters extracted by the extraction unit using the transformation matrix generated by the transformation matrix generating unit;
   an area determination unit configured to determine a plurality of annular areas based on the transformed gradation pattern parameters transformed by the transformation unit, each of the annular areas is specified by an inner boundary line and an outer boundary line surrounding the inner boundary line, the inner boundary line is specified by center coordinates and a radius of a first perfect circular shape calculated by the transformed gradation pattern parameters transformed by the transformation unit, the outer boundary line is specified by center coordinates and a radius of a second perfect circular shape calculated by the transformed gradation pattern parameters transformed by the transformation unit, and the center coordinates of the second perfect circular shape are different from the center coordinates of the first perfect circular shape;

a drawing unit configured to draw a perfect circular radial gradation by drawing each of the annular areas determined by the area determination unit in one color with one color value;

an inverse matrix generating unit configured to generate an inverse matrix of the transformation matrix generated by the transformation matrix generating unit; and an inverse-transformation unit configured to generate an elliptical radial gradation by transforming the perfect circular radial gradation drawn by the drawing unit using the inverse matrix generated by the inverse matrix generating unit.

5. The printing device according to claim 4, wherein the area determination unit includes:

an area setting unit that successively sets each of the annular areas, from a periphery of an area in which the gradation is drawn toward the center of the gradation;

a first boundary line determination unit that determines an inner boundary line of a first annular area set by the area setting unit;

a boundary line storage unit that stores parameters specifying the inner boundary line of the first annular area; and a second boundary line determination unit that determines the inner boundary line of the first annular area as an outer boundary line of a second annular area set by the area setting unit.

6. The printing device according to claim 4, wherein the area determination unit includes:

an area setting unit that successively sets each of the annular areas, from the center of the gradation toward a periphery of an area in which the gradation is drawn;

a first boundary line determination unit that determines an outer boundary line of a first annular area set by the area setting unit;

a boundary line storage unit that stores parameters specifying the outer boundary line of the first annular area; and a second boundary line determination unit that determines the outer boundary line of the first annular area as an inner boundary line of a second annular area set by the area setting unit.

7. An image generating method for generating an image including a gradation, in which a color changes from a center of the gradation through annular areas, according to an image drawing instruction, comprising:

an extraction step of extracting elliptical shape parameters specifying the elliptical shape and including center coordinates of the elliptical shape and gradation pattern parameters specifying a gradation pattern to be drawn in the elliptical shape and including center coordinates of the gradation from the image drawing instruction, when the image drawing instruction includes an instruction for drawing a gradation in an elliptical shape, the center coordinates of the gradation is different from the center coordinates of the elliptical shape;

a transformation matrix generating step of generating a transformation matrix for transforming the elliptical shape into a perfect circular shape based on the elliptical shape parameters extracted in the extraction step;

a transformation step of transforming the gradation pattern parameters extracted in the extraction step using the transformation matrix generated in the transformation matrix generating step;

an area determination step of determining a plurality of annular areas based on the transformed gradation pattern parameters transformed in the transformation step, each of the annular areas is specified by an inner boundary line and an outer boundary line surrounding the inner boundary line, the inner boundary line is specified by center coordinates and a radius of a first perfect circular shape calculated by the transformed gradation pattern parameters transformed by the transformation unit, the outer boundary line is specified by center coordinates and a radius of a second perfect circular shape calculated by the transformed gradation pattern parameters transformed in the transformation step, and the center coordinates of the second perfect circular shape are different from the center coordinates of the first perfect circular shape;

a drawing step of drawing a perfect circular radial gradation by drawing each of the annular areas determined in the area determination step in one color with one color value;

an inverse matrix generating step of generating an inverse matrix of the transformation matrix generated in the transformation matrix generating step; and an inverse-transformation step of generating an elliptical radial gradation by transforming the perfect circular radial gradation drawn in the drawing step using the inverse matrix generated in the inverse matrix generating step.

8. The image generating method according to claim 7, wherein the area determination step includes:

an area setting step of successively setting each of the annular areas, from a periphery of an area in which the gradation is drawn toward the center of the gradation;

a first boundary line determination step of determining an inner boundary line of a first annular area set by the area setting step;

a boundary line storage step of storing parameters specifying the inner boundary line of the first annular area; and a second boundary line determination step of determining the inner boundary line of the first annular area as an outer boundary line of a second annular area set by the area setting unit.

9. The image generating method according to claim 7, wherein the area determination step includes:

an area setting step of successively setting each of the annular areas, from the center of the gradation toward a periphery of an area in which the gradation is drawn;

a first boundary line determination step of determining an outer boundary line of a first annular area set by the area setting step;

a boundary line storage step of storing parameters specifying the outer boundary line of the first annular area; and a second boundary line determination step of determining the outer boundary line of the first annular area as an inner boundary line of a second annular area set by the area setting unit.

* * * * *